US012265984B2

(12) United States Patent
Garside

(10) Patent No.: US 12,265,984 B2
(45) Date of Patent: Apr. 1, 2025

(54) COMPUTERIZED SYSTEMS AND METHODS FOR GOLF COURSE MANAGEMENT

(71) Applicant: GolfNorth Properties Inc., Conestogo (CA)

(72) Inventor: Tyler Garside, Cambridge (CA)

(73) Assignee: GolfNorth Properties Inc., Cambridge (CA)

( * ) Notice: Subject to any disclaimer, the term of this patent is extended or adjusted under 35 U.S.C. 154(b) by 0 days.

(21) Appl. No.: 17/322,069

(22) Filed: May 17, 2021

(65) Prior Publication Data

US 2021/0357968 A1 Nov. 18, 2021

Related U.S. Application Data

(60) Provisional application No. 63/025,208, filed on May 15, 2020.

(51) Int. Cl.
| | | |
|---|---|---|
| *G06Q 30/00* | (2023.01) | |
| *A63B 71/06* | (2006.01) | |
| *G06Q 30/0207* | (2023.01) | |
| *G06Q 30/0226* | (2023.01) | |
| *A63B 102/32* | (2015.01) | |

(52) U.S. Cl.
CPC ..... *G06Q 30/0227* (2013.01); *A63B 71/0669* (2013.01); *G06Q 30/0222* (2013.01); *G06Q 30/0233* (2013.01); *A63B 2102/32* (2015.10)

(58) Field of Classification Search
None
See application file for complete search history.

(56) References Cited

U.S. PATENT DOCUMENTS

| | | | | |
|---|---|---|---|---|
| 6,308,160 | B1 * | 10/2001 | Rex | G06Q 10/02 |
| | | | | 705/5 |
| 7,249,041 | B2 | 7/2007 | Last | |
| 7,634,426 | B2 | 12/2009 | Craw et al. | |

(Continued)

FOREIGN PATENT DOCUMENTS

| | | | | |
|---|---|---|---|---|
| KR | 20140134875 A | * | 11/2014 | G06Q 30/0207 |
| WO | 2008146128 A1 | | 12/2008 | |
| WO | WO-2013055805 A2 | * | 4/2013 | G06Q 30/0207 |

OTHER PUBLICATIONS https://www.ezlinks.com/ezweb-newsdocuments/4q2003.pdf (Year: 2003).*

*Primary Examiner* — Michael Bekerman
(74) *Attorney, Agent, or Firm* — Own Innovation; James W. Hinton

(57) ABSTRACT

Systems and methods for golf course tee time booking, score tracking, and customer relationship management are disclosed in near real-time. The system may be used for administering a loyalty program whereby loyalty points are earned and automatically redeemable for future purchases at golf courses, and for providing rate integrity. For example, the price in dollars for a deal (and the associated fees and taxes) is automatically converted into a point value which is displayed as the purchase price for the deal instead of the dollar amount. The system may be used for automated score tracking for individual rounds of golf, tournaments or leagues. The disclosed system can agglomerate tee time booking and score tracking for individual golf courses or associations of affiliated courses thereby providing customers with a centralized booking system and loyalty program.

11 Claims, 33 Drawing Sheets

(56) References Cited

U.S. PATENT DOCUMENTS

| | | | |
|---|---|---|---|
| 7,953,617 B2 | 5/2011 | Smeenge et al. | |
| 8,810,380 B2 | 8/2014 | Leitz | |
| 9,533,213 B2 | 1/2017 | Clark | |
| 2004/0249681 A1* | 12/2004 | Staten | G06Q 10/02 |
| | | | 705/5 |
| 2008/0040220 A1* | 2/2008 | Levy | G06Q 30/0603 |
| | | | 705/26.1 |
| 2013/0103484 A1* | 4/2013 | McLaughlin | G06Q 30/0226 |
| | | | 705/14.33 |
| 2013/0159087 A1* | 6/2013 | Boyd | G06Q 30/0233 |
| | | | 705/14.33 |
| 2014/0052707 A1* | 2/2014 | Jindra | G06F 16/9535 |
| | | | 707/707 |
| 2016/0346691 A1* | 12/2016 | McClure | A63F 13/335 |
| 2017/0216703 A1* | 8/2017 | Stephens | H04W 4/025 |
| 2019/0244265 A1* | 8/2019 | Van Sant | G06Q 30/0601 |

\* cited by examiner

Leagues

| | | | |
|---|---|---|---|
| Leagues | 640 | Scoresheets | 652 |
| Roster | 641 | Roster Participants | 653 |
| Registration Fees | 642 | Teams | 654 |
| Statistics | 643 | Flights | 655 |
| Statistics Breakdown | 644 | Team Matches | 656 |
| Announcements | 645 | Sponsorships | 657 |
| Convenors | 646 | Skins Sheets | 658 |
| Drawsheets | 647 | Skin Sheet Rounds | 659 |
| Drawsheet Groups | 648 | Leaderboards | 660 |
| Drawsheet Group Members | 649 | Order of Merits | 661 |
| User Scored Formats | 650 | Weeks | 662 |
| Weekly Rosters | 651 | Weekly Roster Participants | 663 |

Memberships

| Memberships | 672 |
| Membership Types | 673 |
| Subscription Monthly Prices | 674 |
| Privileges | 675 |
| Membership Add Ons | 676 |
| Add On Types | 677 |
| Add On Subscription Monthly Prices | 678 |
| Add On Collect | 679 |
| Add On Privileges | 680 |

| Products | |
|---|---|
| Products | 695 |
| Product Variants | 696 |
| Inventory Levels | 697 |
| Product Coursese | 698 |
| Product Images | 699 |
| Product Options | 700 |
| Product Passes Collect | 701 |
| Product Pass Package Collect | 702 |
| Sales Channel Product Collect | 703 |

FIG. 2T

Tournaments — 254

| | |
|---|---|
| Tournaments 732 | Scoresheets 743 |
| Roster 733 | Roster Participants 744 |
| Registration Fees 734 | Teams 745 |
| Invoices 735 | Flights 746 |
| Announcements 736 | Team Rounds 747 |
| Contracts 737 | Sponsorships 748 |
| Convenors 738 | Skins Sheets 749 |
| Drawsheets 739 | Skin Sheet Rounds 750 |
| Drawsheet Groups 740 | Participant Meta Fields 751 |
| Drawsheet Group Members 741 | Participant Meta 752 |
| User Scored Formats 742 | |

FIG. 2AA

COMPUTERIZED SYSTEMS AND METHODS FOR GOLF COURSE MANAGEMENT

TECHNICAL FIELD

The embodiments disclosed herein relate to golf course management, and, in particular to computerized systems and methods for tee time booking, score tracking, customer relationship management and point system for rate integrity.

INTRODUCTION

Golf courses often operate websites and computerized systems for online booking of tee times, tournament scheduling and score tracking as well as for point-of-sale, membership and customer relationship management (CRM). Often, each system (e.g. tee time booking system, score tracking system) is separate system and must be administered separately. For example, paper score cards filled out by golfers during a round of golf must be manually entered into a computerized score tracking system by a golf course employee, or the golfer, once the round is completed. This is inefficient and time consuming. Also, delays in inputting/updating score information is undesirable especially in large tournament formats where fast and accurate score tracking is needed.

Another limitation is that golf course management systems are often operated at the level of individual golf courses, or at the association level for affiliated golf courses. As such, each golf course/association, has its own website for tee time booking, tournament scheduling, etc. This requires individual golfers to visit the respective websites of each golf course/association one at a time to search for available tee times, tournaments, etc., which can be inconvenient and time consuming. A further inconvenience is that different golf courses may display pricing differently (e.g., inclusive of tax, excluding tax, price for members, price for non-members, etc.) which can be time consuming to ascertain all the details.

Many golf courses/associations offer loyalty points or rewards programs whereby golfers can earn points by making purchases. Earned points may, for example, be redeemable for discounts on future purchases. However, each golf course/association may operate their own loyalty program so that points earned at one course are not redeemable at another.

Another issue facing golf clubs is the expedient and efficient tracking of player scores, particularly in tournament settings. In existing computer systems, the round score for a player is only received and recorded once the player has completed the entire round of golf. Furthermore, scores are often tracked using paper score cards, which are then manually entered into a score tracking system once the round of golf is completed. This can lead to bottlenecks and delays in recording and processing player scores as well as an increase in computer resource capacity and load.

Accordingly, there is a need to address the above-noted problems in golf course management and provide a centralized platform for customer relationship management, tee time booking and score tracking.

SUMMARY

Provided are systems and methods for golf course tee time booking, score tracking, point of sale, tee sheet and customer relationship management in near real-time. The system may be used for administering a loyalty program whereby loyalty points are earned and automatically redeemable for future purchases at golf courses. For example, the price in dollars for a deal (and the associated fees and taxes) is automatically converted into a point value to which loyalty points are applied to result in a lowered final price paid by a customer. The system may be used for automated score tracking for individual rounds of golf, tournaments or leagues. The disclosed system can agglomerate tee time booking and score tracking for individual golf courses or associations of affiliated courses thereby providing customers with a centralized booking system and loyalty program.

According to an aspect, there is a system for golf course customer service management and real-time score tracking comprising: a processor and a memory operably coupled to the processor, and having stored thereon processor-executable instructions that, when executed, cause the processor to: store product parameters for a product in a database, including a dollar value for the product; convert the dollar value to a point value according to conversion criteria set by a backend administrator; generate a deal for the product to be presented on an online marketplace; compare a point balance of a user of the online marketplace to the point value to determine a purchase price for the product; and transmit the deal, including the purchase price for the product, to the online marketplace for presenting to the user according to posting criteria set by a course/client administrator. According to various embodiments, the products may be tee times, tee time vouchers and tickets (for various events or tournaments).

The system may be further configured to: receive score tracking parameters of the user; record the score tracking parameters in a scoresheet for the user; and store the scoresheet in the database.

The system may further comprise an administrator device for entering the product parameters received by the backend system. The system may further comprise at least one customer device installed with an application configured for accessing the online marketplace, whereby the user may view the deal. The system may further comprise a customer device configured to: present a score tracking interface via an application running on the customer device; receive the score tracking parameters entered by a user, wherein the score tracking parameters include at least: a hole number, a current hole score and an approach shot selection; and transmit the score tracking parameters to the backend system over a wireless communications network in real-time.

According to an aspect, there is a method for automatically providing rate integrity in golfing products, comprising: storing parameters for a product in a database, including a dollar value for the product; converting the dollar value to a point value according to conversion criteria set by a backend administrator; generating a deal for the product to be presented on an online marketplace; comparing a point balance of a user of the online marketplace to the point value to determine a purchase price for the product; and transmitting the deal, including the purchase price for the product, to the online marketplace for presenting to the user according to posting criteria set by a course/client administrator.

Furthermore, the method provides a functional improvement to the computer system that reduces the system resources required to calculate/convert between different currencies, tax rates, discounts, etc. by provide a normalized points currency for use across different golf courses and clients, for rate integrity.

According to another aspect, there is a method for real-time golf score tracking, comprising: presenting a score tracking interface via an application running on a customer device; receiving score tracking parameters entered by a user of the customer device, wherein the score tracking parameters include at least: a hole number, a current hole score and an approach shot selection; and transmitting the score tracking parameters to a backend system over a wireless communications network in real-time, wherein the score tracking parameters are recorded in a scoresheet for the user and stored in a database by the backend system. The method for real-time score tracking may also provide for tracking the physical location of players on the golf course in real time, thereby providing a physical affect or change.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 2N is an exemplary entry for Leagues in the database of FIG. 2B;

FIG. 2O is an exemplary entry for Marketplace Orders in the database of FIG. 2B;

FIG. 2P is an exemplary entry for Memberships in the database of FIG. 2B;

FIG. 2T is an exemplary entry for Products in the database of FIG. 2B;

FIG. 2AA is an exemplary entry for Tournaments in the database of FIG. 2B;

FIG. 2BB is an exemplary entry for Tours in the database of FIG. 2B;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
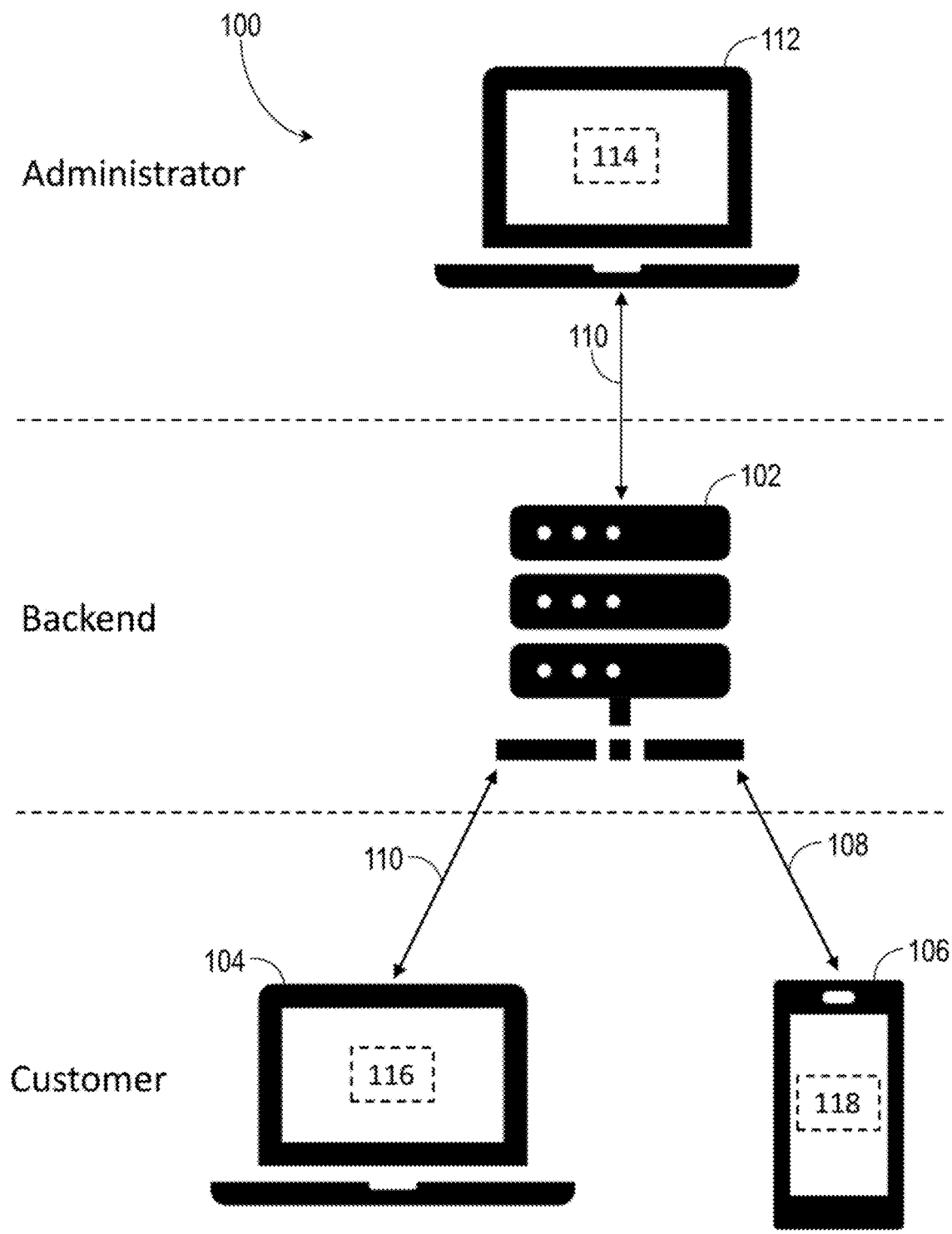
FIG. 1 is a diagram of a golf course management system according to an embodiment.

Referring to FIG. 1, illustrated therein is a system 100 for golf course customer relationship management, in accordance with an embodiment. The system 100 includes a backend system 102 that is described in detail with reference to FIG. 2.

The system 100 includes an administrator device 112. The administrator 112 device may be a desktop or laptop computer with an internet connection and operated by an individual golf course or association. The administrator device 112 is installed with a web browser application that enables the administrator device 112 to run a web application 114 to communicate, and exchange information with, the backend system 102 over the internet 110. The administrator device 112 and the backend system 102 may communicate asynchronously, for example, by implementation of a WebSocket protocol, such as Socket.IO. Information may be sent from the backend system 102 to the administrator device 112 in real time as interrupts, i.e. without polling. Likewise, information may be sent from the administrator device 112 to the backend system 102 in real time as interrupts, i.e. without polling.

The system 100 includes customer devices 104, 106. The customer devices 104, 106 area operated by a customer (i.e., an individual golfer). The customer device 104 may be a desktop or laptop computer with internet connection. The customer device 104 is installed with a web browser application that enables the customer device 104 to run a web application 116 to communicate, and exchange information with, the backend system 102 over the internet 110.

The customer device 106 may be a smartphone or a tablet. Preferably, the customer device 106 includes a touchscreen interface. The customer device 106 is connected to the backend system 102 over a telecommunications network 108. The network 108 may be hard-wired or wireless. The customer device 106 is installed with a native mobile application 118 that enables the customer device 106 to communicate, and exchange information with, the backend system 102 over the communications network 108. The web-based application 116 and the mobile application 118 may be the same core application that is configured to run on the respective operating systems used by each customer device 104, 106.

According to other embodiments, the system 100 includes a plurality of administrator devices 112 connected to the backend system 102 wherein each administrator device 112 is operated by a golf course or golf association. According to other embodiments, the system 100 includes a plurality of customer devices 104, 106 connected to the backend system 102 wherein each customer device 104, 106 is operated by an individual golfer.

Figure 2A:
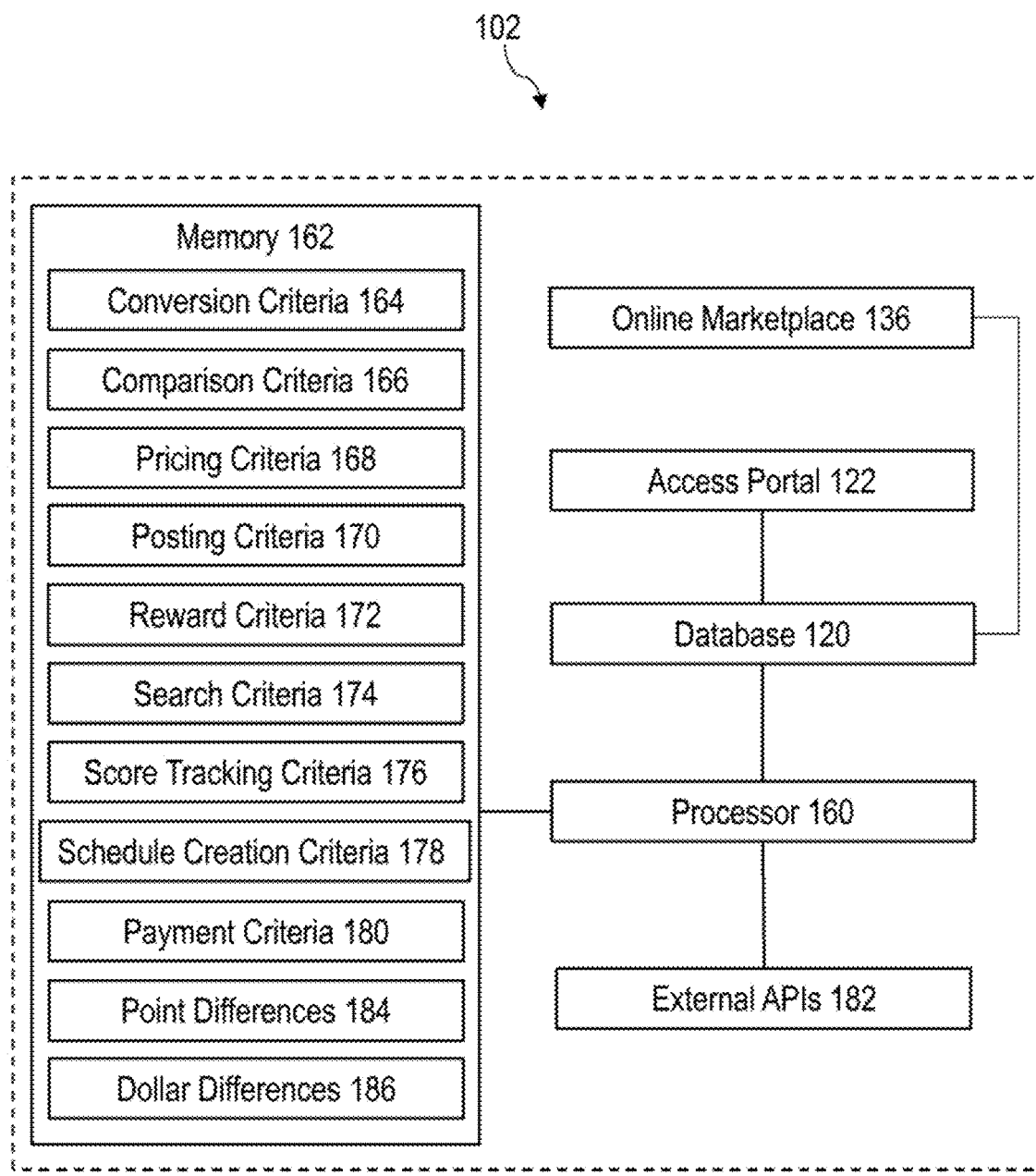
FIG. 2A is a block diagram of the backend system shown in FIG. 1.

Referring to FIG. 2A, illustrated therein is a block diagram of the backend system 102 shown in FIG. 1. The backend system 102 components may be hosted on one or more servers that are operably connected.

The backend system 102 includes an access portal 122 for administrators to access, view and modify the database 120. The access portal 122 may be a secure web portal requiring credentials to log in, for example, a username and a password. The level of access the administrator has to the database 120 may be tied to their user credentials.

The backend system 102 includes external APIs 182. The external APIs 182 are a set of processor-executable instructions for enabling the backend system 102 to connect to, and exchange information with, an external third-party platform, for example, the Stripe payment platform or a customer relations management (CRM) platform. The external API 182 includes instructions for importing or exporting data, between the backend system 102 and the external CRM platform. The external API 182 includes instructions to import/export data in machine-readable formats such as JSON, XML or CSV files.

The backend system 102 includes an online marketplace 136. The online marketplace 136 is provides a platform for customers to purchase deals (i.e. a tee time 714, tee time voucher 718 or ticket 721), memberships 226 and products 236. The online marketplace 136 is accessible to customers via an application running on a customer device (i.e. applications 116, 118 running on customer devices 104, 106 in FIG. 1).

The backend system 102 includes one or more database(s) 120 for storing a plurality of information for golf course management. The database 120 comprises data storage components, for example, hard disk drives, solid state drives, USB flash drives, memory cards accessed via a memory card reader, optical discs accessed via an optical disc drive, or a combination of any two or more of these data storage components. The database 102 may be updated in real time. For simplicity, one database 120 is shown in FIG. 2A, however, other embodiments may comprise multiple databases that are operably connected.

Figure 2B:
FIG. 2B is a block diagram of the database shown in FIG. 2A.
Figure 2C:
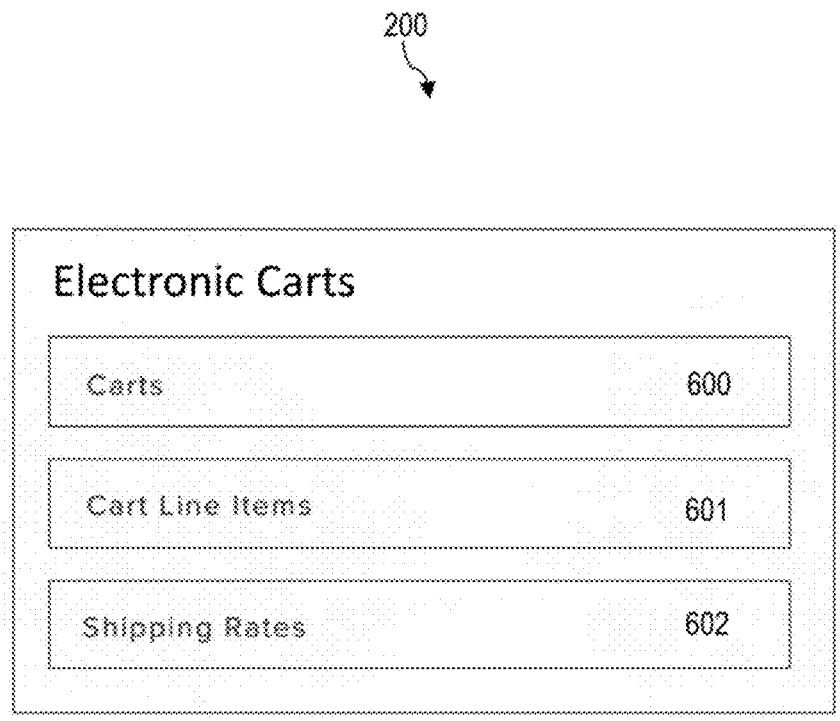
FIG. 2C is an exemplary entry for Electronic Carts in the database of FIG. 2B.

Referring to FIG. 2B illustrated therein is the database 120. The database 120 stores information pertaining to electronic carts 200. Electronic carts 200 are "carts" used in an online marketplace by customers to complete a purchase for products 236. FIG. 2C shows an exemplary entry for electronic carts 200 in the database 120. A cart 600 is saved in a user's session for access at a later time if the customer abandons the checkout process. Each cart 600 has a unique token that is stored in a customer's session in order to retrieve the cart 600 at a later time. Each carts 600 includes: a customer email, a currency, a total price, a tax and a subtotal, notes, shipping information and browser details. When the cart 600 is completed by a customer (when the customer completes payment), the cart 600 is closed and moved to an order 230 associated to a course 208.

Electronic carts 200 includes cart line items 601. Cart line items 601 are individual products and product variants (i.e. product 695 and product variant 696 in FIG. 2T) that a customer has added to their cart 600. Cart line items 601 are attached to single product and a single product variant. The cart line item 601 includes a quantity, a subtotal price, a total price, and a tax.

Electronic carts 200 includes shipping rates 602. Shipping rates 602 are customized shipping options and prices that are created by a course or client administrator. Shipping rates 602 include a title, a type and a price if the shipping rate 602 is not free. Shipping rates 602 are attached to a specific client 202 and can be attached to a specific course 208 if the shipping rate 602 is only available for specific courses 208. Shipping rates 602 can also have minimum and maximum price attributes that are used to determine if the shipping rate 602 is available to select in a cart 600. For example, if a shipping rate 602 has a minimum price of $100 and the shipping rate 602 is free or $0, the cart 600 must have a subtotal price of at least $100 in order for that shipping rate 602 to appear. Shipping rates 602 can also have a minimum and maximum weight attribute that is used to determine if a shipping rate 602 is available to select in a cart 600.

Referring back to FIG. 2B, the database 120 stores information pertaining to clients 202. Clients 202 are an ownership or management group. An entry for a client 202 in the database 102 includes a name, an address, a website, contact information, logos, etc. The client 202 owns/manages one or more golf courses and can create, edit and delete entities within a course 208, including leagues 224, tournaments 254, orders 230, etc. The client 202 may manage one or more tours 256. The client 202 can create, edit and delete products 236, passes 232, orders 230, etc. for their courses 208 and tours 256. Clients 202 can process orders 230.

Still referring to FIG. 2B, the database 120 stores information pertaining to course members 204. Course members 204 are members of a specific client 202 and have purchased a membership 228. Course members 204 are attached to a specific membership 228. A course member 204 is a single customer 210. When a course member 204 record is created for a customer 210, a customer collect record (i.e. customer collect record 621 in FIG. 2G) is created for the customer 210 and client 202 if it does not already exist. The course member 204 membership can be processed through an order 230.

Figure 2D:
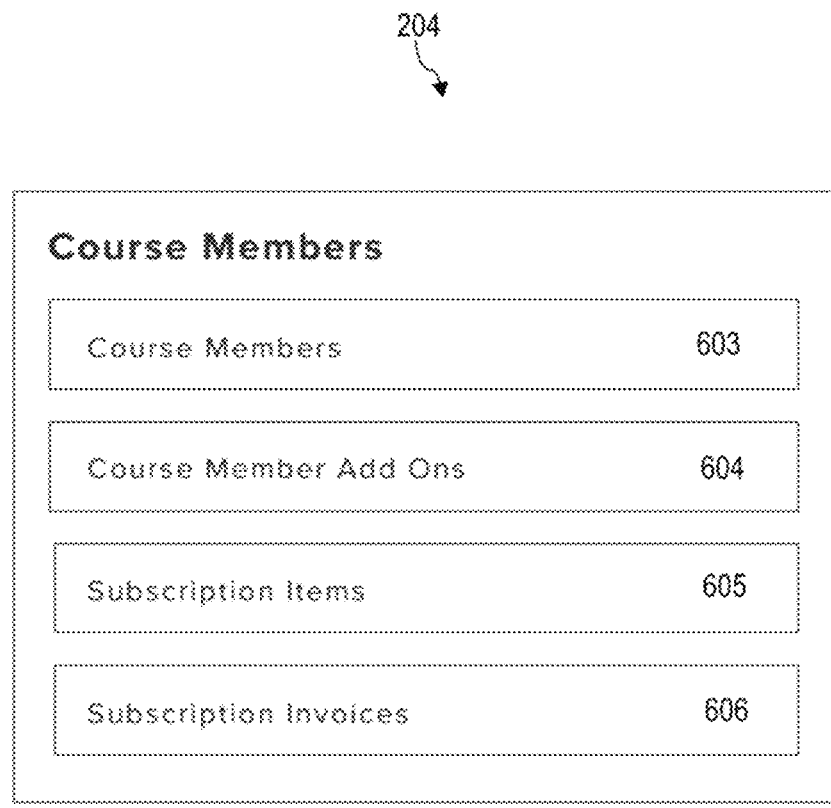
FIG. 2D is an exemplary entry for Course Members in the database of FIG. 2B.

FIG. 2D shows an exemplary entry for course members 204 in the database 120. Course members 204 includes course members 603. Course members 603 includes a membership type, a membership number, a location or a course 208 that processed the course member 603, a status of the membership, a card number, notes and a season the membership is valid for. The course member 603 includes a home course set which is used to prevent course members 204 from being added to course member-specific tournaments (i.e. tournaments where members can only participate if the tournament is being hosted by their home course).

Course members 204 includes course member add-ons 604. Course member add-ons 604 are membership related add-ons for memberships 228, for example, locker rentals or cart rentals, etc. Course member add-ons 604 include a membership type, a membership add-on number, a location where it was processed, a status of the membership, and a season the membership is valid for. A course member add-on 604 may not have an attached course member 204 record.

Course members 204 includes subscription line items 605. Subscription line items 605 are individual items that are to be charged when a course member subscription is processed. The subscription line item 605 includes an item name, a month that is being charged and payment details including a price, a quantity, a tax, etc. The subscription line items 605 is also attached to a specific course member 603, a single product and a single product variant (i.e. product 695 and product variant 696 in FIG. 2T).

Now referring to FIGS. 2B and 2D, course members 204 includes subscription invoices 606. Subscription invoices 606 are used to automatically charge a customer when the customer has purchased a subscription type membership. The subscription invoice 606 includes a status of the invoice (open, closed, pending, etc.). The subscription invoice 606 is attached to a single course member 204 and a single customer 210. The subscription invoice 606 is also attached to an order 230 when the invoice 606 has been processed and the customer's card has been charged. The subscription invoice 606 also stores the date and time when the invoice was processed. Subscription invoices 606 are run automatically on the first of every month using a CRON job. Open subscription invoices 606 are processed and the customer's card is charged. Thereafter, a new option course member subscription is created for the next month with the corresponding subscription line items 605. If a customer 210 cancels their subscription membership 228, their future subscription invoices 606 are cancelled.

Figure 2E:
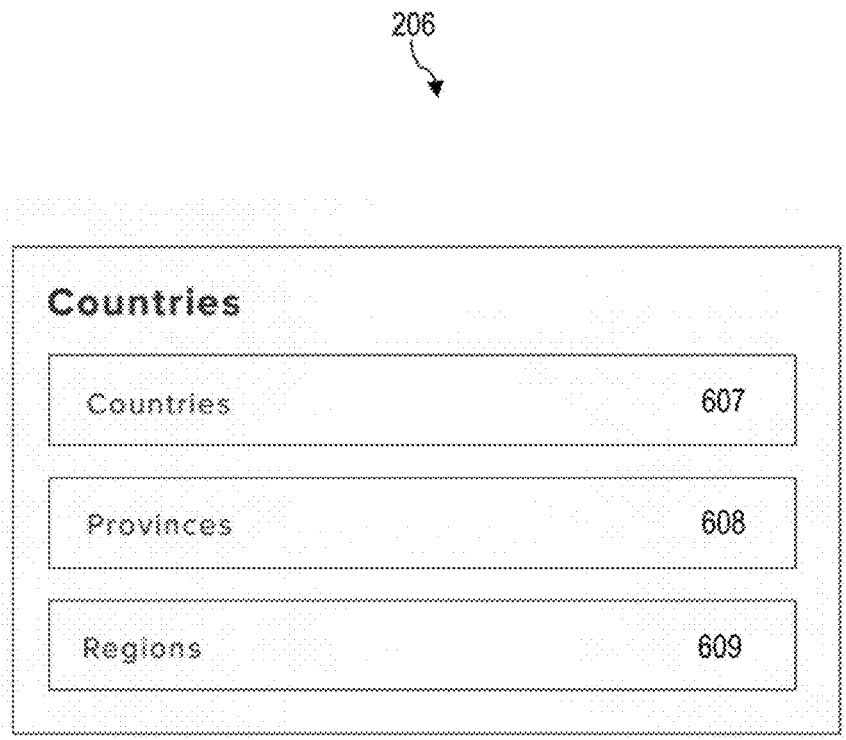
FIG. 2E is an exemplary entry for Countries in the database of FIG. 2B.

Referring back to FIG. 2B, the database 120 stores information pertaining to countries 206. FIG. 2E shows an exemplary entry for countries 206 in the database 120. Countries 206 includes countries 607. Countries 607 is information about the country including a name, abbreviated code, and the default currency. Countries 607 also holds information about the tax rate used. This information includes a name of the tax (ex. GST), a tax rate (0.05), and a tax percent (5.00%).

Referring to FIGS. 2B and 2E, countries 206 includes provinces 608. A province 608 is a record in the database 120 referring to a state/province within a country. The province 608 must be attached to a specific country 607. The province 608 includes a name and an abbreviated code (e.g. "ON"). The province 608 also includes taxes that are to be added when creating orders 230, which include a tax name (HST), a tax rate (0.13), a tax percent (13.0%) and a type of taxes that the province uses. If the province uses a harmonized tax system, then only the province's tax rate is used within orders. If the province has a normal tax type, then the province's tax rate is used and combined with the country's tax rate.

Countries 206 includes regions 609. Regions 609 are geographical regions within a state/province. A region 609 includes a name and is attached to a specific country 607 and province 608. Regions 609 are set by a system 102 administrator when a course 208 is set up.

Figure 2F:
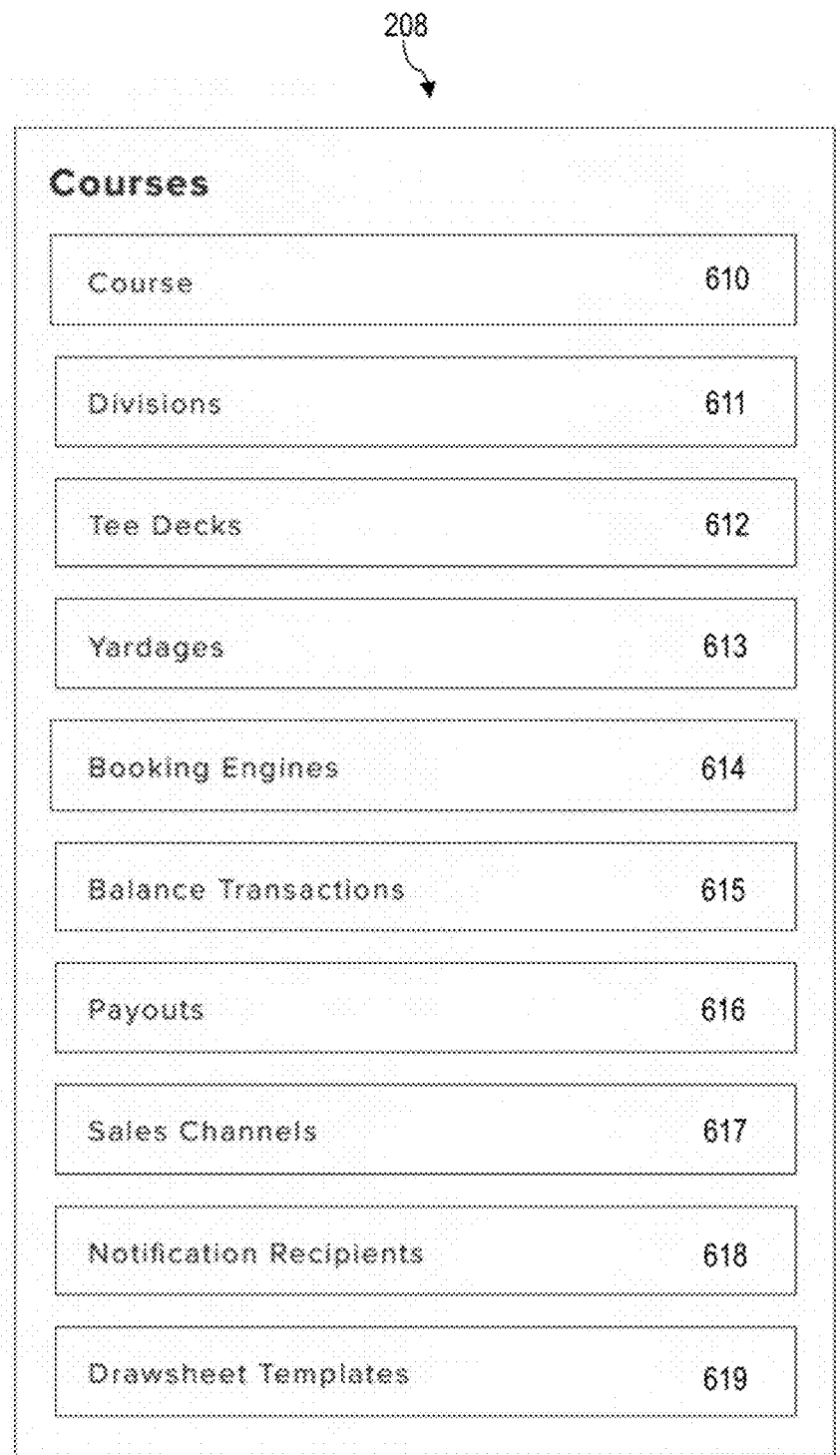
FIG. 2F is an exemplary entry for Courses in the database of FIG. 2B.

Referring to FIG. 2B, the database 120 stores information pertaining to courses 208. Courses 608 are attached to a specific client 202. FIG. 2F shows an exemplary entry for courses 208 in the database 120. Courses 208 includes courses 610. A course 610 is a single golf course facility. Courses 610 includes an address, contact information, etc.

Courses 208 includes divisions 611. Divisions 611 are a set of 9 holes at a golf course 610. For example, an 18 hole course 610 will have a Front Division and a Back Division with each division 611 having a set of 9 holes. The division 611 includes a hole par for each hole, a handicap, a league handicap and hole images.

Courses 208 includes tee decks 612. Tee decks 612 are a set of tees that a golfer plays their round from. A course 610 has one or more tee decks 612 that have various yardages 613. The tee deck 612 includes a name, a course rating and a slope rating.

Courses 208 includes yardages 613. Yardages 613 are a set of distances for a certain hole within a division 611. A yardage 613 is connected to one division 611 and one tee deck 612. A yardage 613 contains a 9-hole array of yardages, each individual number representing the hole's distance.

Courses 208 includes booking engines 614. Booking engines 614 are unique URLs that are used to access tee times from courses 208. A booking engine 614 includes a title, a URL, and details on which tee times to query. The booking engine 614 also stores which course's tee time should be displayed on the booking engine 614. For example, the booking engine 614 includes "public tee times from Courses A, B and C". Tee Times from Course D will be included in another booking engine 614. A course 208 can belong to multiple booking engines 614. Booking engines 614 are set for the courses 202 but are set up by backend system 102 administrators.

Courses 208 includes balance transactions 615. Balance transactions 615 are a list of transactions that directly correspond to a course's available balance in dollars. Balance transactions 615 include: an amount of the transactions, a fee charged on the transaction for processing a credit card, a net amount which is what is added/subtracted from the course's available balance, a currency of the amount, a date/time that the balance transaction was processed on, and a date/time that the balance transaction is available to be paid out.

The balance transaction 615 is attached to a payout 616 once the payout 616 has been generated by the backend system 102. The balance transaction 615 has a status depending on whether the funds have been paid to the course's bank account. The balance transaction 615 includes a type which describes the type of balance transaction. For example, the type can be a charge, refund or adjustment. The balance transaction 615 is attached to an order transaction that created the balance transaction 615. The balance transaction 615 is also attached to the order 230, where the balance transaction 615 originated from.

Referring to FIGS. 2B and 2F, courses 208 includes payouts 616. A payout 616 is a transfer/deposit of funds/dollars from a course's Stripe account to their bank account. The payout 616 has an authorization string that is used to track the payout 616 within Stripe's system. The payout 616 also includes a status of the payout, a date of the payout, the currency of the payout and the amount being deposited. The payout 616 is also directly attached to a course 208, a tour 256 or a client 202. This determines where the payout 616 is sent to and which bank account the funds are deposited into.

Courses 208 includes sales channels 617. A sales channel 617 is a way that a course 208 or client 202 can sell various products. A sales channel 617 includes a name of the channel and a type of channel. The sales channel 617 is attached to a client 202 and/or a course 208. The sales channel 617 contains a set of products 236 that are available to purchase through the sales channel 617. The products 236 that are attached to the sales channel 617 are determined by the product collections 234.

Courses 208 includes notification recipients 618. Notification recipients 618 are course administrators that wish to receive notifications for various actions that happen within the backend system 102. The notification recipient 618 includes: a name of the recipient, and email address. The email address is where the notification email is sent to. The notification recipient 618 also includes a list of notification types they wish to receive. These types including point of sales notifications, online order notifications, registration notifications, payout notifications, daily sales notifications and order refund notifications.

Courses 208 includes draw sheet templates 619. Draw sheet templates 619 are a set of draw sheet groups that are saved by a course 610. Draw sheet templates 619 can be applied to a tournament draw sheet (739 in FIG. 2AA) or a league draw sheet (647 in FIG. 2N). Draw sheet templates 619 include an array of groups. Draw sheet templates 619 are directly attached to a course 610.

Figure 2G:
FIG. 2G is an exemplary entry for Customers in the database of FIG. 2B.

Referring back to FIG. 2B, the database 120 stores information pertaining to customers 210. Customers 210 can either be active users, or accounts that have been created by a course 202 or client 202 administrator. FIG. 2G shows an exemplary entry for customers 210 in the database 120. Customers 210 include customers 620. Customers 620 include a first and last name and an email address. A user can log in to their Customer 620 account using their email address and password.

Now referring to FIGS. 2B and 2G, customers 210 includes customer collect records 621. Customer collect records 621 are used to connect a single customer 620 to a client 202. One customer 620 can be attached to multiple clients 202, but a client 202 cannot retrieve a customer's 620 information unless they are attached to the client 202 using a customer collect record 621. Customer collect records 621 are created by: adding a customer 210 to a league 224 or tournament 254 as a roster participant (i.e. 641 in FIG. 2N or 733 in FIG. 2AA); creating and processing an order for a customer 210, or being initialized by a customer 210 when they log in to a client's 202 white-labelled system. A client 202 or course 208 administrator can only query customers 210 that are attached to their client 202 using a customer collect record 621. Customer collect records 621 are used to prevent clients 202 from obtaining information from any customer 210 within the backend system 102. For example, Client A cannot retrieve all customers 210 from Client B, and vice versa.

Customers 210 includes customer addresses 622. Customer addresses 622 are records that stores a customer's address information. Customer addresses 622 include: a first, a last name, an address, a province and a country, a postal code and a phone number. A customer address 622 must be attached to a specific customer 620 and a client 202. A client 202 can only retrieve customer addresses 622 for a customer 620 if the customer address 622 has been created for the client 202. For example, if Customer A belongs to Client A and Client B, Client A cannot retrieve any customer addresses 622 that are created for the customer 210 and belong to Client B. This means that one customer 620 can have multiple customer address 622 records that are the same, but belong to two different clients 202. A customer 620 may have a default customer address 622.

Customers 210 includes customer cards 623. Customer cards 623 is a saved record of a customer's credit card on their account. A customer card 623 is used by course administrators to charge a saved credit card on a customer's account. The customer card 623 does not include credit card details, only the last 4 digits of the card and the brand of the card. The customer card 623 stores a unique card ID that is used to charge the credit card using Stripe's API 182. The customer card 623 is saved to a specific client 202 and a client 202 or course administrator can only retrieve saved customer cards 623 that belong to their customer 620.

Customers 210 includes customer statistics 624. Customer statistics 624 643 are a group of statistics that are calculated for a single customer 210. Customer statistics 624 include rounds posted for the customer 210 across all leagues 224, tournaments 254 and personal play they participate in within the system 102.

Figure 2H:
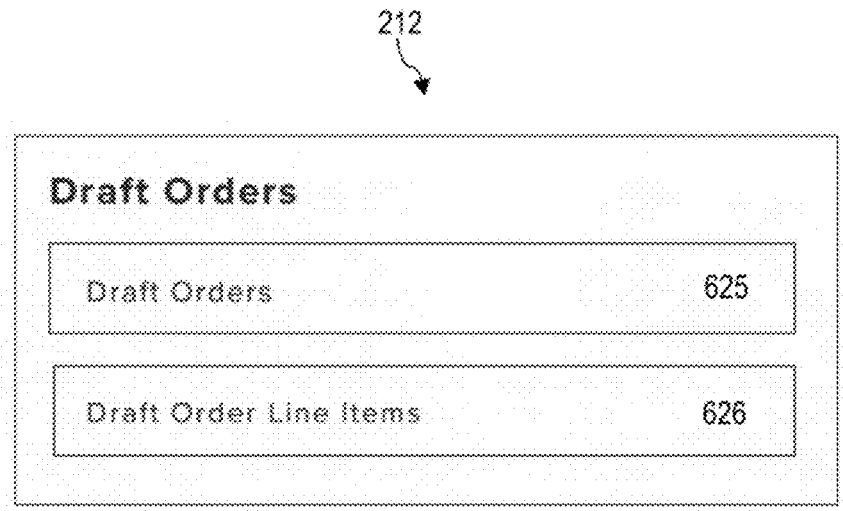
FIG. 2H is an exemplary entry for Draft Orders in the database of FIG. 2B.
Figure 2I:
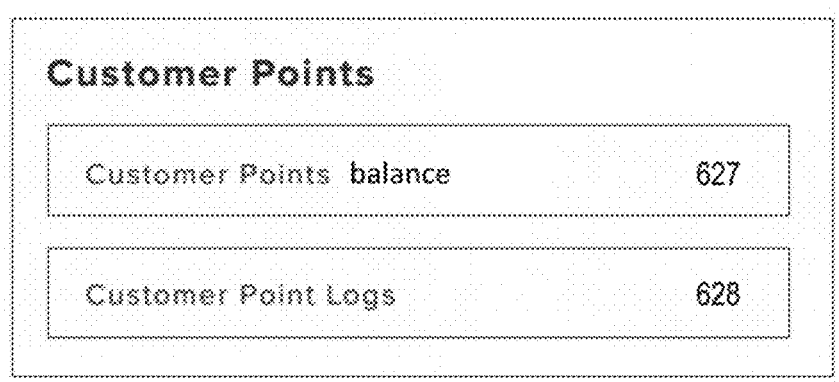
FIG. 2I is an exemplary entry for Customer Points in the database of FIG. 2B.

Referring back to FIG. 2B, the database 120 stores information pertaining to draft orders 212. Draft orders 212 are temporary orders before they are processed into orders 230. FIG. 2H shows an exemplary entry for draft orders 212 in the database 120. Draft orders 212 include draft orders 625. Draft orders 230 are used to hold temporary draft order line items 626. Course administrators can build out a draft order 625 before completing it into an order. Draft orders 625 are not used in any reports, sales reports, etc. Draft orders 626 can be attached to a single customer 210 and a customer address. Draft orders 625 include a total price, total taxes, tax lines, etc. Draft orders 625 are automatically stored so they may be accessed at a later date to complete if needed.

Draft orders 212 includes draft order line items 626. Draft order line items 626 are added to a draft order 625. Draft order line items 626 are attached to a specific product and product variant (i.e. product 695 and product variant 696 in FIG. 2T). Draft order line items 626 are not used in any reporting, sales reports, etc. Draft order line items 626 include a product name, a price, taxes, etc.

Referring back to FIG. 2B, the database 120 stores information pertaining to points 214. Points 214 are the currency that is used to sell tee time vouchers (718 in FIG. 2X), tee times (714 in FIG. 2W) and tickets (721 in FIG. 2Y) on the online marketplace, or generally, any deal posted to the online marketplace 136. All deals (tee times vouchers, tee times tickets) are posted with a point value instead of a dollar value. Points 214 are used on the marketplace to mask the dollar amount of the deal, and thus used to control rate integrity at a course 208 and between courses operated by the same client 202 or different clients 202.

2I shows an exemplary entry for points 214 in the database 120. Points 214 includes customer points balance 627. Customer point balance 627 stores and tracks the number of points a customer 620 has available. The point balance 627 is stored as an integer value and is attached to a single customer 620. Point balance 627 also stores a referral code which can be used by other customer 210 to receive a referral discount. Any change to the point balance 627 is recorded as a customer point log 628 record.

Points 214 includes customer point logs 628. Customer point logs 628 are a list of transaction or changes to a customer's point balance 627. The customer point log 628 includes: an action type, a description, a user that created this log, and notes. For example, points log 628 may state "115 points were redeemed from your account for purchase," or "10 point credit applied for unavailable carts." The customer point log 628 is connected to a single customer 210.

Referring back to FIG. 2B, the database 120 stores information pertaining to marketplace contests 216. Marketplace contests 216 are contests run within the backend system 102 to collect user data and emails. Marketplace contests 216 are sent to users, where users enter in their full name and email address in exchange for a ballot into the contest.

Figure 2J:
FIG. 2J is an exemplary entry for Marketplace Contests in the database of FIG. 2B.

FIG. 2J shows an exemplary entry for marketplace contests 216 in the database 120. Marketplace contests 216 includes marketplace contests 629. Marketplace contests 629 include: a title, a prize title, terms and information, a start time and an end time, legal information, and a header image. Marketplace contests 629 can also provide referral ballots to users. Referral ballots are distributed if a user gets other users to enter the contest using their unique link. Marketplace contests 629 includes a set number of ballots that the referrer user receives for each referral entry they get to enter the contest. For example, a user will receive an additional 5 ballots in the marketplace contest 629 for every referral entry that enters the contest.

Marketplace contests 216 includes marketplace contest entries 630. Marketplace contest entries 630 are a single user record entering the contest. Marketplace contest entries 630 include a user's full name and email address. Each marketplace contest entry 630 is provided its own unique referral code which is then provided to the user as a full link. The user sends this entire link to family friends, etc, to receive referral ballots. Marketplace contest entries 630 also store the number of base ballots, the number of referral ballots and the total number of ballots a user has in the contest. Marketplace contest entries 630 are connected to a single marketplace contest 629. Marketplace contest entries 630 also store the referral link a user used when entering the contest. This link is stored and monitored for fraudulent ballots.

Referring back to FIG. 2B, the database 120 stores information pertaining to marketplace gift cards 218. A marketplace gift card 218 is an electronic gift card that is used to apply a set number of points to a customer's point balance (i.e. customer point balance 627 in FIG. 2I). Marketplace gift cards 218 are redeemed by a customer 210 on their account using a card number and a pin. When redeeming, the card number and pin must match in order for the redemption to be successful. Marketplace gift cards 218 have a balance which stores the number of points is applied to a customer's account balance.

Figure 2K:
FIG. 2K is an exemplary entry for Marketplace Gift cards in the database of FIG. 2B.

FIG. 2K shows an exemplary entry for marketplace gift cards 218 in the database 120. Marketplace gift cards 218 includes marketplace gift cards 631. Marketplace gift cards 631 have a status which states whether the gift card is still open, redeemed, cancelled, etc. When a marketplace gift card 631 is redeemed, the customer 210 is attached to the marketplace gift card 631 so it can be tracked who has redeemed the card. Marketplace gift cards 631 can carry an expiry date. After the expiry date has passed, the marketplace gift card 631 can no longer be redeemed. Marketplace gift card 631 can be attached to a marketplace gift card collection 632 which can determine where marketplace gift cards 630 were distributed along with limit the number of marketplace gift cards 631 one unique customer 210 can redeem.

Marketplace gift cards 218 includes marketplace gift cards collections 632. Marketplace gift card collections 632 are a group of marketplace gift cards 631. One marketplace gift card 631 can belong to one marketplace gift card collection 632. Marketplace gift card collections 632 include: a name (which could be a tournament that the cards were supplied to, a trade show event, etc.), along with a customer limit. If a customer limit is greater than 0, one unique customer 210 can only redeem anumber up to the customer limit of marketplace gift cards 631 that belong to that marketplace gift card collection 632.

Figure 2L:
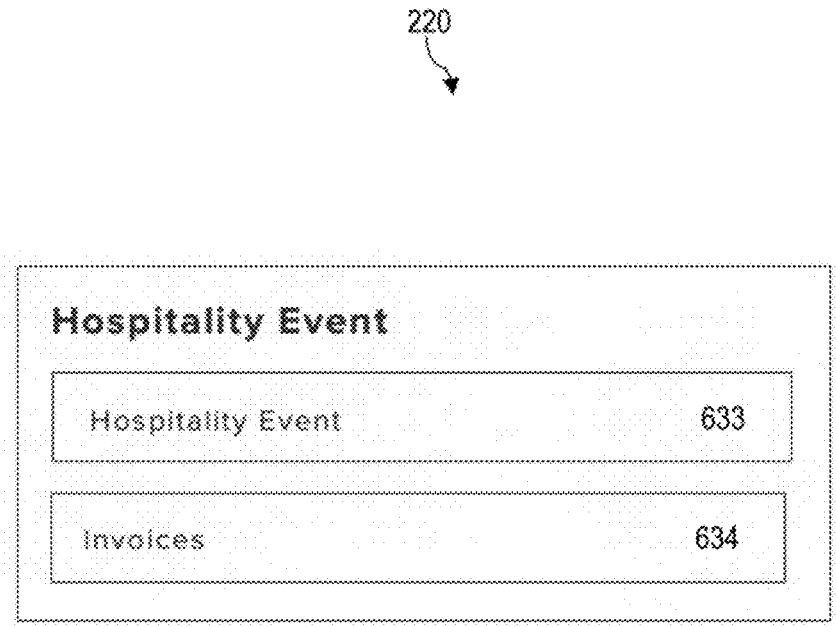
FIG. 2L is an exemplary entry for Hospitality Events in the database of FIG. 2B.

Referring back to FIG. 2B, the database 120 stores information pertaining to hospitality events 220. A hospitality event 220 is an event that is hosted at a course 208 that does not relate to golf (i.e. a banquet, a wedding, etc.). FIG. 2L shows an exemplary entry for hospitality events 220 in the database 120. Hospitality events 220 include hospitality events 633. A hospitality event 633 includes: a name of the event, a date of the event, a time, an event type, etc.

Referring to FIGS. 2B and 2L, hospitality events 220 includes hospitality invoices 634. Hospitality invoices 634 are orders 230 that are built within a hospitality event 633 that does not require payment upfront. These orders 230 can be marked as 'Pending' while the course administrator is awaiting payment from the customer 210. Hospitality invoices 634 are connected to a single hospitality event 633 and a single order 230.

Referring back to FIG. 2B, the database 120 stores information pertaining to inter club leagues 222. Inter club leagues 222 are a group of leagues 224 that compete against each other in weekly matches i.e. an inter club league 222 includes multiple leagues 224. A league 224 does not have to be on the same day of the week in order to participate in an inter club league 222 (ie. a league played on Wednesday can compete against a league played on Friday). A league 224 can be a part of an unlimited number of inter club leagues 222. Inter club leagues 222 can be set up by a client 202 administrator or backend system 102 administrator.

Figure 2M:
FIG. 2M is an exemplary entry for Inter Club Leagues in the database of FIG. 2B.
Figure 20:

FIG. 2M shows an exemplary entry for inter club leagues 222 in the database 120. Inter club leagues 222 includes inter club leagues 635. Inter club leagues 635 store information including a name, scoring settings, a logo. Scoring within the inter club league 635 is automatic as it pulls information from each league scoresheet 652 for each roster participant 637.

Referring to FIGS. 2B and 2M, inter club leagues 222 include a roster 636. The roster 636 is a list of participating leagues 224 within the inter club league 222. Each league 224 within the inter club league 635 is recorded as a roster participant 637. The roster 636 stores information about each league 224 participating including the course 208 it is from, a name of the league, a financial status, etc.

Inter club leagues 222 includes roster participants 637. A roster participant 637 is a single league 224 that is participating in the inter club league 635. The roster participant 637 can be a part of one or more inter club leagues 224.

Inter club leagues 222 include matches 638. A match 638 is record of a competition set up between two roster participants 637. The match 638 includes the two Inter roster participants 637, a winner and a loser. Matches 638 can be automatically generated using a round robin generator (not shown).

Inter club leagues 222 includes inter club weeks 639. Inter club weeks 639 determine a time period within the inter club league 635 in which matches take place. An inter club week 639 has a start date and an end date. For example, Week 1 starts on Monday May 4 and ends on Sunday May 10. This is used to determine which scores to use from a League 222 in matches 638. For example, a match 638 has League A competing against League B in Week 1 from Monday May 4, until Sunday May 10. League A plays and posts their scores on Tuesday May 5, while League B plays and posts their scores on Wednesday May 6. The inter club league 635 will use the time frame set in the week 639 to determine that it needs to use the scores from May 5 and May 6. These scores are then used within the inter club league match 638 to determine a winner.

Referring back to FIG. 2B, the database 120 stores information pertaining to leagues 224. Leagues 224 are a set of golf events that typically run on a weekly basis throughout the golf season. For example, a league 224 may be a men's round running every Wednesday night—i.e. players play a round of golf every Wednesday and compete against the other players in the League 224.

FIG. 2N shows an exemplary entry for leagues 224 in the database 120. Leagues 224 include leagues 640. Leagues 640 includes: a name, a day of the week, a time of day, etc. Leagues 640 also have scoring settings including a scoring method, a scoring option, a number of holes and a tee deck.

Leagues 224 includes a roster 641. The roster 641 is a list of players (golfers) that are a part of the league 640. A player must be on the roster 641 in order to be able to play a round and post a score.

Now referring to FIGS. 2B and 2N, leagues 224 includes registration fees 642. Registration fees 642 are options that a customer 210 can select when registering for a league 640. Registration fees 642 are attached to a specific product and product variant (i.e. product 695 and product variant 696 in FIG. 2T), which become order line items within an order (i.e. order line items 682 within order 681 in FIG. 2Q). Registration fees 642 are attached to a specific league 640. The registration fee 642 is for a specified number of players.

The registration fee 642 can be one of two types—a "Registration Fee" or an "Add-on". When registering for a league 222, a customer 210 can only select one (1) registration fee 642 with type "Registration Fee", but can select one to many registration fees 642 with type "Add-on". The registration fee 642 has a set of default tags. These default tags are added to the roster participant 653 when their order 230 is completed. These tags include information about the registration fee 642 or what is included with paying the registration fee. For example, the tag may be "Golfer", "Meal Only", "Includes Cart", etc. The registration fee 642 also has the option to allow guests or not. If enabled, the customer 210 completing the registration must include the other players required in the registration fee 642 Number of Players attribute. If disabled, the customer 210 does not have to include the other player's information.

Leagues 224 includes league statistics 643. League statistics 643 are a group of statistics that are calculated for a single customer 210. League statistics 643 include rounds posted for the customer 210 across all leagues they participate in within the system.

Referring to FIGS. 2B and 2N, leagues 224 include league statistics breakdown 644. League statistics breakdown 644 are a group of statics that are calculated for a single customer 210 within one league 640. League statistics breakdown 644 are for a specific league 640 and are usually for one season. For example, a men's league player at Course A will have a league statistic breakdown 644 that is calculated solely based on the rounds posted within the league 640.

Leagues 224 includes league announcements 645. League announcements 645 are posts that are posted to a league 224 by a course administrator or league convenor 646. League announcements 645 are used to relay information to all league participants 653 which includes weekly winners, weather information, etc. League announcements 645 are attached to a specific league 640. League announcements 645 can be sent to league participants 653 via email.

Referring to FIGS. 2B and 2N, leagues 224 includes league convenors 646. League convenors 646 are customers 210 that are attached to a league 640 and given privileges to manage and edit said league 640. League convenors 646 are usually one of the main customers 210 that organize, run or execute a league 646 on a weekly basis. A league 640 can have multiple league convenors 646 but must have a default league convenor 646. League convenors 646 can also be set up to receive notifications. These notifications are sent to league convenors 646 via email and includes notifications such as registration receipts, round posting, responses to invites, etc.

Referring to FIG. 2N, leagues 224 includes league draw sheets 647. League draw sheets 647 include one or more league draw sheet groups 648 and are an organization tool for a course administrator and league convenor 646 to manage league participants 653 and their starting holes and groups. A league draws sheet 647 includes a start time and is attached to a specific league 640.

Referring to FIG. 2N, leagues 224 includes draw sheet groups 648. A league draw sheet group 648 is a group within a league draw sheet 647. A league draw sheet group 648 has information including a start time or a tee time of the group, a starting hole, a division (i.e. division 611 in FIG. 2F), etc. The league draw sheet group 648 also include a sponsorship 657 and a sponsorship URL where a logo can be uploaded. League draw sheet group 648 can be attached to a specific tee time on a course's tee sheet (i.e. tee time 714 and tee sheet 712 in FIG. 2W).

Referring to FIG. 2N, leagues 224 includes draw sheet group members 649. A league draw sheet group member 649 is a record of a single league roster participant 653 within a league draw sheet group 648. The draw sheet group members 649 is attached to a specific league draw sheet group 648 and a league draw sheet 647. The draw sheet group members 649 includes the league roster participant 653 name. The draw sheet group member 649 may include a name of a company or sponsorship 657.

Referring to FIG. 2N, leagues 224 includes league user scored formats 650. User scores formats 650 are games, contests, etc., that are run for a league 640 where a winner is decided regardless of a score. For example, the user scores format 650 may be a closest to the pin contest, longest drive contest, etc. League user scored formats 650 have information including a name, a prize, a hole the contest is on, etc. A league user scored format 650 is directly attached to a league scoresheet 652.

Leagues 224 includes weekly rosters 651. League weekly rosters 651 are a list of league participants as weekly roster participants 663 and track whether the league participant intends to play that week.

Referring to FIG. 2N, leagues 224 includes league scoresheets 652. Scoresheets 652 are created to hold an array of league rounds. A league scoresheet 652 is set up for each league week 662. For example, if the league 640 has 20 weeks 662, the league 640 would have 20 league scoresheets 652. League scoresheets 652 are created by a course administrator or league convenor 646. The league scoresheet 652 includes the one or two divisions that are being played, a date, a name, a scoring method, and scoring option.

Referring to FIGS. 2B and 2N, leagues 224 includes league participants 653. A league participant 653 is a single customer 210 that has registered for a specific league 640. The league participant 653 the relationship between the customer 210 and the league 640 including their financial status, orders 230, a preferred tee deck 612, notes and tags. When a league participant 653 registers for a league 640 or is manually added by a course administrator/league convenor 646, a customer collect 621 record is created between the customer 210 and the client 202.

Referring to FIG. 2N, leagues 224 includes teams 654. A league team 654 is a group of league participants 653 set up within a league 640. The league team 654 contains any number of league participants 653 and a name for the team 654. League teams 654 accumulate points based on how many points it's league participants 653 receive within a league scoresheet 652. League teams 654 can be added to a league flight 655.

Referring to FIG. 2N, leagues 224 includes league flights 655. League flights 655 are a group of league participants 653 or a group of league teams 645. League flights 655 include a name, a minimum handicap index and a maximum handicap index. If a league flight 655 is made up of multiple league participants 653, the league flight 655 can be auto generated based and league participants' Handicap Index. The system (i.e. the backend system 102) will assign a league participant 653 to a league flight if their Handicap Index falls within the flight's min/max handicap index numbers.

Referring to FIG. 2N, leagues 224 includes team matches 656. A league team match 656 is a single competition between two league teams 654 within a league scoresheet 652. Multiple league team matches 656 are typically set up within a league 640, and run as a weekly round robin system. For example, match 1 may be Team A versus Team B within a league scoresheet 652. The league participants' 653 points awarded or scores posted on Team A are accumulated and compared to those accumulated on Team B. The league team 654 with the higher score is awarded the win for the league team match 656 and the league team 654 is awarded points for the season leaderboard 660.

There may be a plurality of league team matches 656 within a league 640. The backend system 102 will autogenerate an entire round robin schedule for the league 640. The course administrator or league convenor 646 enters in the number of weeks and the number of teams 654, and the backend system 102 creates all of the league teams, a league team match 656 for each league team 654 every week and a league scoresheet 652 for each week (called the League Round Robin Generator).

Referring to FIG. 2N, leagues 224 includes league sponsorships 657. A league sponsorship 657 includes a name and/or logo of a company that is sponsoring a league 640. League sponsorships 657 are added and uploaded within the league 640 by the course administrators or the league convenor 646. League sponsorships 657 are displayed on cart signs, scorecards, registration pages, etc.

Referring to FIG. 2N, leagues 224 include league skin sheets 658. A league skins sheet 658 contains an array of league skin sheet rounds 659. League skins sheets 658 determine the lowest score without ties on any particular hole within the round. The lowest score can be determined by either the gross scores or net scores. League skins sheet sounds 659 contain information such as a title, a minimum course handicap, a maximum course handicap, as well as a front nine and a back nine division. The League skins sheet round 659 can also contain a limit on the number of strokes that are awarded on a single hole if the league skins sheet 658 is being determined by net score.

Leagues 224 includes skin sheet rounds 659. League skin sheet rounds 659 are a league round that has been added to a league skins sheet 658. One league round can be added to multiple league skins sheets 658, therefore creating multiple league skins sheet rounds 659.

Leagues 224 includes leaderboards 660. Leaderboards 660 track the position of league roster participants 653, teams 654 and flights 655 through the season.

Leagues 224 includes order of merits 661. League order of merits track the position of league roster participants 653 and the sum of their rounds/points accumulated throughout the season.

Leagues 224 includes weeks 662. League weeks 662 separate the league 640 into weeks and include the weekly breakdown of information in weekly rosters 651, scoresheets 652, etc. Leagues 651 usually run for ~20 weeks, thus the league 651 would have 20 individual league weeks 662 created.

Leagues 224 includes weekly roster participants 663. Weekly roster participants 663 are a list of league roster participants 653 grouped and tracked whether the league participant intends to play that week.

Referring back to FIG. 2B, the database 120 stores information pertaining to marketplace orders 226. Marketplace orders 226 are used to process a transaction between a backend system 102 administrator and a customer 210. Marketplace orders 226 may be used for reporting, sales reports, payouts, etc.

FIG. 2O shows an exemplary entry for marketplace orders 226 in the database 120. Marketplace orders 226 includes the marketplace order line items 664 that were processed. A marketplace order line item 664 is a single product and product variant (i.e. product 695 and product variant 696 in FIG. 2T) that is processed within a marketplace order 664. The marketplace order line item 664 includes: a product title, a product variant title, a price, a quantity, tax lines, etc. The marketplace order line item 664 can be marked as "fulfillment required." If the marketplace order line item 664 has fulfillment required, it means that the backend system 102 administrator is required to send the customer a tangible item and/or process a certain task (i.e. marketplace order line item 664 could be a gift card that requires the backend system 102 administrator to mail out to the customer).

Referring to FIG. 2O, marketplace orders 226 includes order transactions 666. Marketplace order transactions 666 are the process or transfer of funds within a marketplace order 664. Marketplace order transactions 666 are attached to a specific marketplace order 664. Marketplace order transactions 666 can be of various types depending on the flow of funds, for example, a charge, a refund, an adjustment, etc. Marketplace order transactions 666 include: an amount that was processed and a currency it was processed in. If the marketplace order transaction 666 is a refund, it is attached to the original charge marketplace order transaction 666. If a credit card was used in the marketplace order transaction 666, it also stores the last 4 digits and company of the card (for display purposes only).

Referring to FIG. 2O, marketplace orders 226 includes marketplace order refunds 667. Marketplace order refunds 667 are created when a refund is processed within a marketplace order 664. A marketplace order refund 667 will have at least one marketplace order refund line item 668. Marketplace order refunds 687 include are attached to a marketplace order 664. Marketplace order refunds 667 include: refund notes, and a date the refund was processed. The marketplace order refund 667 also stores payment information including a subtotal, taxes and a total amount being refunded. The marketplace order refund 667 is always processed in the same currency of the original marketplace order transaction 666.

Referring to FIG. 2O, marketplace orders 226 includes marketplace refund line items 668. Marketplace refund line items 668 are items that are being refunded to the customer within a marketplace order refund 667. The marketplace refund line item 668 is directly attached to the marketplace order line item 665 it originated from. The marketplace refund line item 668 includes: a price, a subtotal and a total amount being refunded for the marketplace order line item 665. Marketplace refund line items 668 also include a quantity being refunded and whether or not the quantity is added back to the course's corresponding inventory level for the product and product variant (i.e. product 695 and product variant 696 in FIG. 2T).

Referring to FIG. 2O, marketplace orders 226 includes marketplace order fulfillments 669. Marketplace order fulfillments 669 are processed by a backend system 102 administrator for a marketplace order 664. Marketplace order fulfillments 669 are attached to a specific marketplace order 664. Marketplace order fulfillments 669 include: a fulfillment number and a status. Shipping information can also be added to a marketplace order fulfillment 669 if required.

Referring to FIG. 2O, marketplace orders 226 includes order fulfillment line items 670. Marketplace fulfillment line items 670 are records of marketplace order line items 665 being fulfilled by a backend system 102 administrator. A marketplace fulfillment line item 670 is attached to single marketplace order line item 664. Marketplace fulfillment line items 670 include: a quantity being fulfilled and titles of the product and product variant (i.e. product 695 and product variant 696 in FIG. 2T). Marketplace fulfillment line items 670 are attached to a single marketplace fulfillment 669.

Marketplace orders 226 includes order adjustments 671.

Referring back to FIG. 2B, the database 120 stores information pertaining to memberships 228. Memberships 228 are a product that is purchased by a customer 210. Memberships 228 are attached to a single client 202. Memberships 228 are set up by client 202 or course 208 administrators.

FIG. 2P shows an exemplary entry for memberships 228 in the database 120. Memberships 228 includes memberships 672. Memberships 672 include: a title, a type of membership, a round limit if applicable, etc. Memberships 672 are attached to a single product and product variant (i.e. product 695 and product variant 696 in FIG. 2T). Memberships 672 are set up when a new membership product 236 is created.

Memberships 228 include membership types 673. Membership types 673 describe the nature of membership 672. For example, membership types 673 may be, a multi course, single course, subscription, round package, etc.

Now referring to FIGS. 2B and 2P, memberships 228 includes subscription monthly prices 674. Membership subscription monthly prices 674 determine the price that a customer 210 pays for their membership 672 based on the month. Since golf is weather and season dependent, the client 202 and course 208 administrator can create a membership 672 that charges a different membership subscription monthly price 674 for each month of the year. For example, the membership subscription monthly price 674 for April is set as $400 and for July is set at $800. Membership subscription monthly prices 674 are connected to a single membership 672, and single product and single product variant (i.e. product 695 and product variant 696 in FIG. 2T). A membership subscription monthly price 674 also includes a month of the year and a price to charge the customer 210. Membership subscription monthly prices 674 are used when building course Member Subscription Invoices and Course Member Subscription Items.

Memberships 228 includes course privileges 675. Course privileges 675 are records that describe the privileges a customer 210 receives with a membership 672. A course privilege 675 is attached to a single membership 672 and a single course 208. Course privileges 675 are connected to green fee rates and pricing. Course privileges 675 include a privilege type and a percent discount. The privilege type can be one of the following values: "Full", "Percent" or "None." If the privilege type is Percent, an integer can be entered in for a percent discount. For example, a membership 672 has a privilege type set to Percent with a percent discount of 25. This means that any course member 204 with this membership 672 will receive 25% a green fee rate at the specified course 208.

Referring to FIGS. 2B and 2P, memberships 228 includes membership add-ons 676. Membership add-ons 676 are a product/service that does not include privileges towards green fees or golf. For example, membership add-on, may be for a cart membership, a locker rental, a range pass, etc. Membership add-ons 676 include a title and are attached to a membership type 673 which determines how the membership add-on 676 is paid for and the privileges received. Membership add-ons 676 are attached to a single product and product variant (i.e. product 695 and product variant 696 in FIG. 2T).

Memberships 228 includes membership add-on types 677. A membership add-on type 677 describes the type of privileges that the membership add-on 676 provides such as "Cart", "Storage", "Range", etc. For example, the add-on type "Cart", would provide privileges towards all cart related products 236 at the course 208.

Referring to FIGS. 2B and 2P, memberships 228 includes membership add-on subscription monthly prices 678. Add-on subscription monthly prices 678 determine the price that a customer 210 pays for their membership add-on 676 based on the month. Since golf is weather and season dependent, a client 202 and course 208 administrator can create a membership add-on 676 that charges a different price for each month of the year. For example, the add-on subscription monthly price 678 for April is set as $400 and July is set at $800. Membership add-on subscription monthly prices 678 are connected to a single membership add-on 676, and single product and single product variant (i.e. product 695 and product variant 696 in FIG. 2T). Membership add-on subscription monthly prices 678 include: a month of the year, and a price. Membership add-on subscription monthly prices 678 are used when building Course Member Subscription Invoices and Course Member Subscription Items.

Referring to FIGS. 2B and 2P, memberships 228 includes add-on collect 679. Add-on collects 679 are records that connect a single membership add-on 676 to one or more memberships 228. Add-on collects 679 are used to easily view membership add-ons 676 when a membership 672 is being processed for a customer 210 and order 230. This avoids the need for multiple membership add-ons 676 for all memberships 228. Instead one membership add-on 676 can be connected directly to Membership A and Membership B. Anyone purchasing Membership A or Membership B will have the option to purchase the attached membership add-on(s) 676.

Referring to FIGS. 2B and 2P, memberships 228 includes add on privileges 680. Add-on privileges 680 describe the membership add-on 676. Add-on privileges 680 are attached to a specific membership add-on 676 and course 208. Add-on privilege 680 also has a privilege type which determines if the privilege is "Full", "Percent" or "None." If the privilege type is Percent a percent discount can be entered. For example, if a membership add-on 676 had a Percent privilege type and 25 as the percent discount, the customer 210 would receive 25% off of cart products 236 automatically in their orders 230.

Referring back to FIG. 2B, the database 120 stores information pertaining to orders 230. Orders 230 are used to process a transaction between a course 208 and a customer 210. Orders 230 may be used for reporting, sales reports, payouts, etc.

Figure 2Q:
FIG. 2Q is an exemplary entry for Orders in the database of FIG. 2B.

FIG. 2Q shows an exemplary entry for orders 230 in the database 120. Orders 230 include orders 681. Orders 681 includes the order line items 682 that were processed. An order line item 682 is a single product and product variant (i.e. product 695 and product variant 696 in FIG. 2T) that is processed within an order 681. The order line item 682 includes: a product title, a product variant title, a price, a quantity, tax lines, etc. Order line items 682 can be marked as "fulfillment required." If the order line item 682 has fulfillment required, it means that the course administrator is required to send the customer a tangible item and/or process a certain task (i.e. the order line item 682 could be a gift card that requires the course administrator to mail out to the customer).

Referring to FIG. 2Q, orders 230 includes order transactions 683. Order transactions 683 are the process or transfer of funds within an order 681. Order transactions 683 are attached to a specific order 681. Order transactions 683 can be of various types depending on the flow of funds, for example, a charge, a refund, an adjustment, etc. Order transactions 683 include: an amount that was processed and a currency it was processed in. If the order transaction 683 is a refund, it is attached to the original charge order transaction 683. If a credit card was used in the order transaction 683, it also stores the last 4 digits and company of the card (for display purposes only).

Referring to FIG. 2Q, orders 230 includes order refunds 684. Order refunds 684 are created when a refund is processed within an order 681. An order refund 684 will have at least one order refund line item 685. Order refunds 684 include: the order 681 it is attached to, refund notes, and a date the refund was processed. The order refund 684 also stores payment information including a subtotal, taxes and a total amount being refunded. The order refund 684 is always processed in the same currency of the original order transaction 683.

Referring to FIG. 2Q, orders 230 includes order refund line items 685. Refund line items 685 are items that are being refunded to the customer within an order refund 684. The refund line items 685 is directly attached to the order line item 682 it originated from. The refund line item 685 also includes payment information including: a price, a subtotal and a total amount being refunded for the order line item 682. Refund line items 685 also include a quantity being refunded and whether or not the quantity is added back to the course's corresponding inventory level for the product and product variant (i.e. product 695 and product variant 696 in FIG. 2T).

Referring to FIG. 2Q, orders 230 includes order fulfillments 686. Fulfillments 686 are processed by a course administrator for an order 681. Fulfillments 686 are attached to a specific order 681. Fulfillments 686 include: a fulfillment number and a status. Shipping information can also be added to a fulfillment 686 if required.

Orders 230 includes order fulfillment line items 687. Fulfillment line items 687 are records of order line items 682 being fulfilled by a course administrator. A fulfillment line item 687 is attached to single order line item 682. Fulfillment line items 687 include: a quantity being fulfilled, titles of the product and product variant (i.e. product 695 and product variant 696 in FIG. 2T). Fulfillment line items 687 are attached to a single fulfillment 686.

Orders 230 includes order adjustments 688.

Referring back to FIG. 2B, the database 120 stores information pertaining to passes 232. Passes 232 are vouchers distributed by a course 208 or client 202. A pass 232 entitles the bearer to certain privileges. For example, the pass 689 may entitle the bearer to "18 Holes of Golf with Cart at Course A."

Figure 2R:
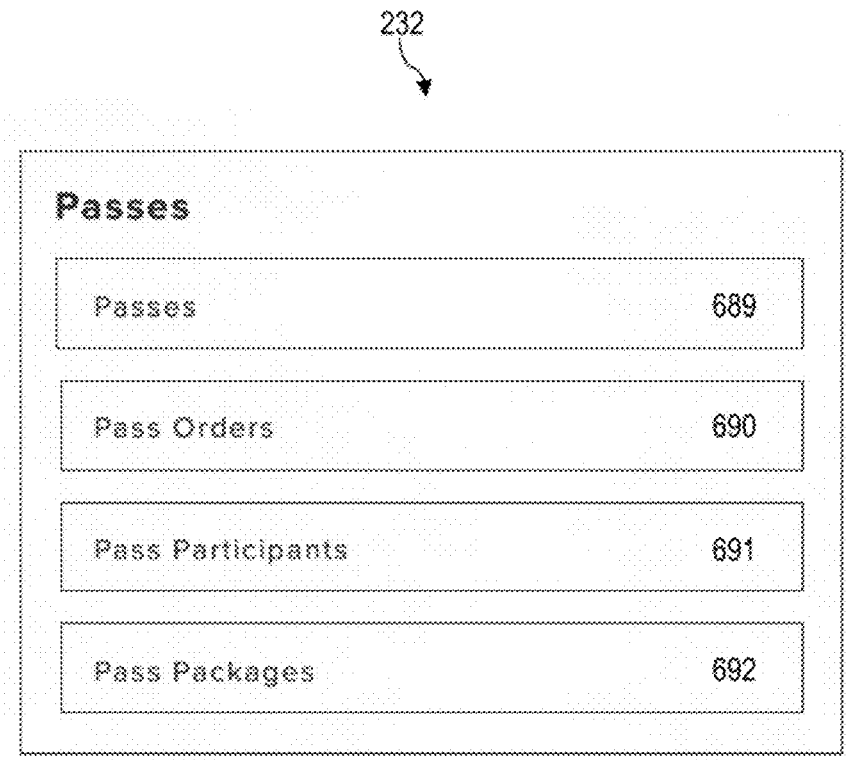
FIG. 2R is an exemplary entry for Passes in the database of FIG. 2B.

FIG. 2R shows an exemplary entry for passes 232 in the database 120. Passes 232 includes passes 689. A pass 689 can have multiple pass orders 690 created for it. The pass 689 includes terms and information mirrored on to all individual pass orders 690 that are created for that pass 689. The pass 689 is valid at one or more courses 208. These courses 208 are the only courses 208 that every pass order 690 can be redeemed at.

Now referring to FIGS. 2B and 2R, passes 689 may be updated and edited for each season. For example, if one hundred (100) pass orders 690 were created for a specific pass 689, and then that pass 689 had its expiry date changed, only new pass orders 690 created will have the new expiry date. The previous 100 pass orders 690 created will have the old expiry date. This works for the seasons for a golf course. For example, Course A has a '18 Holes of Golf' pass 689 that is valid until Oct. 31, 2019. The course administrator sends out 200 passes throughout the 2019 season. Now the course administrator wants to send out the exact same pass 689 for 2020 with an Oct. 31, 2020 expiry date. The course administrator can change the expiry date so all pass orders 690 created from that point forward will be attached to the same pass 689 as the ones in 2019, but have the new expiry date. Passes 689 are attached to a product and product variant (i.e. product 695 and product variant 696 in FIG. 2T) using a product pass collect record. Pass orders 690 are generated for the pass 689 when the attached product and product variant are sold through an order 230 as an order line item 682.

Referring to FIG. 2R, passes 232 includes pass orders 690. A pass order 690 is an order that is created for a specific pass 689. The pass order 690 has a unique numeric code that is used for redemption and tracking purposes. This numeric code also generates a barcode that can be scanned when the pass 689 is presented at the course 208. The pass order 690 mirrors the details that are set within the parent pass 689 and includes terms and information, expiry dates, logos, valid courses, etc. The pass order 690 includes a status that is displayed. The status may be "Valid," "Redeemed," "Expired" or "Cancelled." Once the pass order 690 is Redeemed, a redemption date and time are recorded along with the course 208 that redeemed it in the system. Each pass order 690 has a PDF URL source where the PDF is stored. This is accessible by the course administrator to access the pass order 690 in certain situations. These situations includes a lost pass order 690 or a pass order 690 that was not delivered to the customer.

Passes 232 includes pass participants 691. A pass participant 691 is an individual pass that has been created for a customer. The pass participant 691 contains a unique serial number and barcode use to redeem at one of the valid courses. A pass participant 691 is a mirror image (aside from the barcode and number) of the pass 689 it was created from.

Referring to FIGS. 2B and 2R, passes 232 include pass packages 692. Pass packages 692 are set up to generate multiple pass orders 690 when a single pass 689 is sold through an order 230 as an order line item. The pass package 692 is connected to a product and product variant (i.e. product 695 and product variant 696 in FIG. 2T) through a pass package collect record (i.e. product pass package collect 701 in FIG. 2T). The pass package collect record is the connection of a pass 689 to a pass package 692. The Pass Package Collect record connects the two together, and also provides a quantity field. This quantity field is used to determine how many pass orders 690 to create for the pass 689 when sold.

Passes 689 can be added to a pass package 692 by course administrators or client administrators. Only passes 689 attached to the client 202 can be added to their pass packages 692. A backend system 102 administrator can add passes 689 from multiple clients 202 into one pass package 692 that can be sold by each of the clients 202. For example, there is one pass package 692, including a pass from Client A, a pass from Client B and a pass from Client C. The pass package 692 can then be attached to a specific product and product variant (i.e. product 695 and product variant 696 in FIG. 2T) using a Product Pass Packages Collect record for each client, and then sold through an order. When Client A (or one of it's Courses) sells this pass package 692, the pass order 690 is created for each pass 689 (even though the pass(es) belong to a different Client. This option can only be set up by backend system 102 administrators.

The pass package 692 includes: at least one pass 689, a title, and is connected to the pass 689 through a Pass Package Collect. The pass package 692 is connected to a single client 202. Pass Packages 692 are used to sell one product and product variant (i.e. product 695 and product variant 696 in FIG. 2T) but generate different passes 689. For example, a pass package 692 may sell for $500.00 and includes three individual pass orders 690 for Pass A and 2 individual pass orders 690 for Pass B.

Referring back to FIG. 2B, the database 120 stores information pertaining to product collections 234. A product collection 234 is a group of products 236. The products 236 may be grouped based on certain criteria set out by the course 208 or client 202 administrators.

Figure 2S:
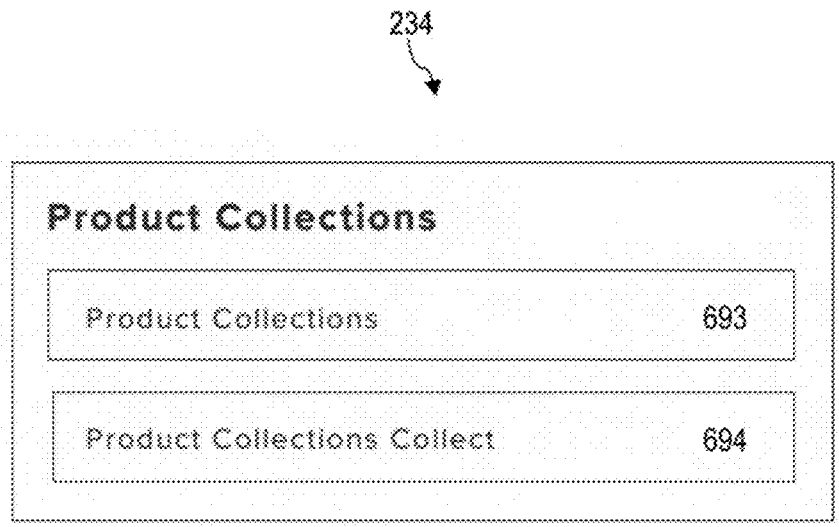
FIG. 2S is an exemplary entry for Product Collections in the database of FIG. 2B.

FIG. 2S shows an exemplary entry for product collections 234 in the database 120. Product collections 234 includes product collections 693. A product collection 693 includes: a name of the collection, a URL specific handle and an image. A product collection 693 has an "available on" and "unavailable on" time stamps. These time stamps are used by course or client administrators to determine when the product collection 693 should become available online. If the current time does not fall between these two times, the product collection 693 is not available to customers.

Still referring to FIG. 2S, product collections 234 includes product collections collect 694. A product 695 is connected to specific product collections 693 using a product collections collect 694 record. The product collections collect 694 record includes: the product 695, the product collection 694 it is attached to, and its sorting position within the product collection 693. One product 695 may be a part of an unlimited number of product collections 693.

Referring back to FIG. 2B, the database 120 stores information pertaining to products 236. Products 236 are individual items that are sold by a course 208 administrator or client 202 administrator through an order 230.

FIG. 2T shows an exemplary entry for products 236 in the database 120. Products 236 include products 695. A product 695 includes: a title, a handle, an option, a type, a description, and a vendor. The product 695 has an applicable tax attribute which determines which taxes to charge when purchasing the product 695. The option may be "Course" or "Customer." If Course is chosen, the applicable taxes in the course's province are used. If Customer is chosen, the applicable taxes in the customer's province are used. The product 695 has an "available on" and "unavailable on" time stamps. These dates and times are used to determine when the product 695 can be purchased online by customers. These time stamps can be used to delay the release of a product 695, or limit the time in which the product 695 is available. The product 695 has at least one product variant 696. A product can have up to three (3) product options 700.

Referring to FIGS. 2B and 2T, products 236 includes product variants 696. Product variants 696 are an option or options for a product 695. Product variants 696 must be attached to a single product 695. If a product 695 only has one product variant 696, the product variant 696 mirrors the product's information. Product variants 696 include: a title, a price, a sale price, a default image, a barcode, and SKU. Product variants 696 include information about the product options 700 that it is attached to. A product variant 696 can be attached to up to 3 product options 700, depending on the number of product options 700 are attached to the parent product 695. Product variants 696 are what is added as an order line item 682 within an Order 681. Product variants have an inventory level 697 for each course 208 within a client 202.

Referring to FIG. 2T, products 236 includes inventory levels 697. Inventory levels 697 are used to determine the quantity available for a product variant 696 at a specific course 208. The inventory level 697 includes: a quantity, and whether the quantity needs to be tracked. An inventory level 697 can be selected to track or not track the quality available. If the inventory level 697 is not tracked, the course administrator can sell an unlimited number of the attached product variants 696. If the inventory level 697 is tracked, the course administrator can only sell up the available quantity.

Referring to FIGS. 2B and 2T, products 236 includes product courses 698. Product courses 698 are used to allow a course 208 to sell a product 695 and product variant 696 as an order line item 682 in an order 230. For example, Course A may access Product A and Product B, but Course B can only access Product A. Course A would have a product courses 698 record attaching Course A to Product A and a record attaching it to Product B. Course B would only have a record attaching Course B to Product A. When a course queries or searches for products 695, they can only view/access products 236 that they have product courses 698 records for. Product courses 698 are managed by clients 202 and client administrators.

Referring to FIG. 2T, products 236 includes product images 699. Product images 699 are images that are attached to a Product 695. Product images 699 are uploaded by a course administrator or client administrator. A product image 699 can be attached to a product variant 696 (sets it as a default image for that product variant 696). Product images 699 store information including a source link, a width and a height.

Products 236 includes product options 700. Product options 700 are options that are available to select for a product 695. A product option 700 can have an array of values that determine the product variants 696. For example, of a product option 700 may be called 'Size' and have values of 'Small', 'Medium' and 'Large'. A product 695 can have up to three product options 700. Product options 700 automatically determine the product variants 696 that are created for a product 695. If a product 695 has one product option 700 of 'Size' with values of 'Small', 'Medium' and 'Large', there will be three product variants 696 created with names 'Small', 'Medium' and 'Large'. If a product 695 has two product options 700, one named 'Size' with values of 'Small', 'Medium' and 'Large' and another named 'Colour' with values of 'Red', 'Blue' and 'Green', there will be 9 product variants 696 created with names 'Small/Red', 'Medium/Red', 'Large/Red', 'Small/Blue', etc.

Referring to FIGS. 2Q and 2T, products 236 includes product passes collect 701. Product passes collect 701 is used to connect a pass 689 to a product 695 and product variant 696. Product passes 701 are used to determine which pass 689 to create when the product 695 is processed as an order line item 682 in an order 681. If a product 695 with product type set to 'Pass' is processed as an order line item 682, the backend system 102 will look for a product passes collect 701 record that is attached to that product 695 and product variant 696 (one product 695 and product variant 696 combination can only be attached to one pass 689). If the record exists, one pass order 690 is created for that pass 689 attached to the order's customer 210.

Products 236 includes product pass package collect 702. Product pass packages collect 702 is used to connect a pass package collect 701 to a product 695 and product variant 696. Product pass packages collect 702 is used to determine which passes 689 to create when a product 695 is processed as an order line item 682 in an order 230. If the product 695 with a Product Type set to 'Pass Package' is processed as an order line item 682, the system will look for a product pass packages collect 702 record that is attached to that product 695 and product variant 696 (one product 695 and product variant 696 combination can only be attached to one pass package 692). If the record exists, the backend system 102 will then look for the pass package 692 created and the passes 689 within the pass package 692 (using the pass packages collect 701 records). The backend system 102 will then generate pass orders 690 for each pass 689 attached to the pass package 692 and the quantity created for each pass 689 is determined by the pass packages collect 701 record.

Referring to FIG. 2T, products 236 includes sales channel product collect 703. Sales channel products collect 703 is used to attach a product 695 to a course's sales channel (i.e. sales channel 617 in FIG. 2F). Sales channel products collect 703 store information including the product 695 and the sales channel it is attached to. When a customer loads up a course's sales channel, they can only view products 236 that have a sales channel product collect 703 record for that sales channel. For example, given Product A and Product B, a course only wants to allow Product A to be sold through the their sales channel called "Online Marketplace." The course would created a new sales channel products collect 703 record connecting Product A to their "Online Marketplace" sales channel.

Referring back to FIG. 2B, the database 120 stores information pertaining to national associations 238. A national association 238 may be attached to one or more provincial associations 240, all of which the national association 238 may manage. A national association 238 may be attached to one or more courses 208 within which the national association 238 can view.

Figure 2U:
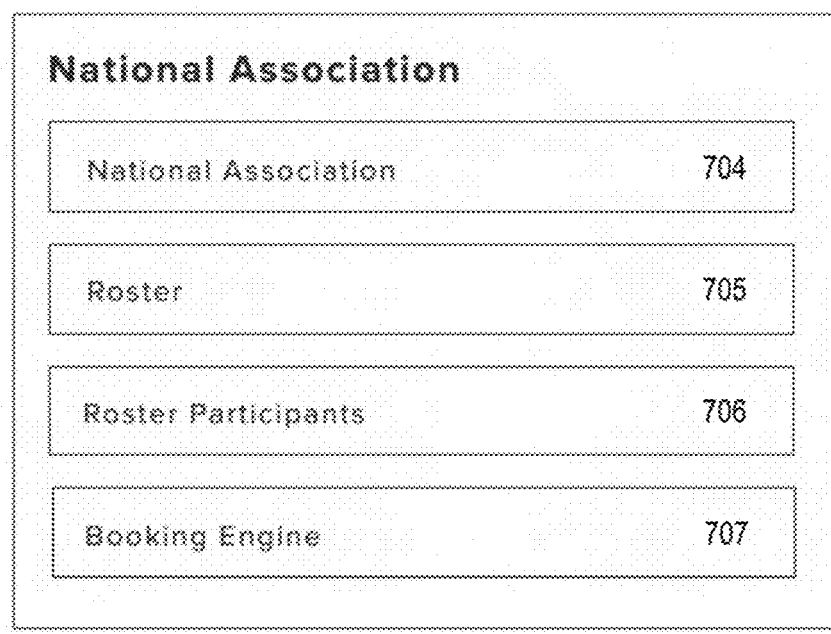
FIG. 2U is an exemplary entry for National Association in the database of FIG. 2B.

FIG. 2U shows an exemplary entry for national associations 238 in the database 120. National associations 238 includes national associations 704. A national association 704 is a level of administrator for the backend system 102.

National associations 238 includes a national roster 705. A national roster 705 is a list of national roster participants 706 that a national association 704 can manage. A national association 704 can have any number of national rosters 709, each with their own focus, purpose and information. A national roster 704 includes national roster participants 706.

National associations 238 includes national roster participants 706. A roster participant 706 is a single customer 210 that is attached to a national roster 706. A national roster participant 706 includes payment details, a status, a name, membership details, etc.

Referring to FIGS. 2B and 2U, national associations 238 includes a national booking engine 707. The booking engine 707 is a unique URL that is used to access tee times from courses 208. The booking engine 707 includes a title, a URL, and details on which tee times to query. The booking engine 707 also stores which course's tee time should be displayed on the booking engine 707. For example, the booking engine 707 includes "public tee times from Courses A, B and C". Tee Times from Course D will be included in another booking engine 707. A course 208 can belong to multiple booking engines 707. Booking engines 707 are set for the national association 704 but are set up by system (i.e. backend system 102) administrators.

Referring back to FIG. 2B, the database 120 stores information pertaining to provincial associations 240. The provincial association 240 is attached to a national association 238. The provincial association 240 may be attached to one or more courses 208 within which a provincial association 240 can view.

Figure 2V:
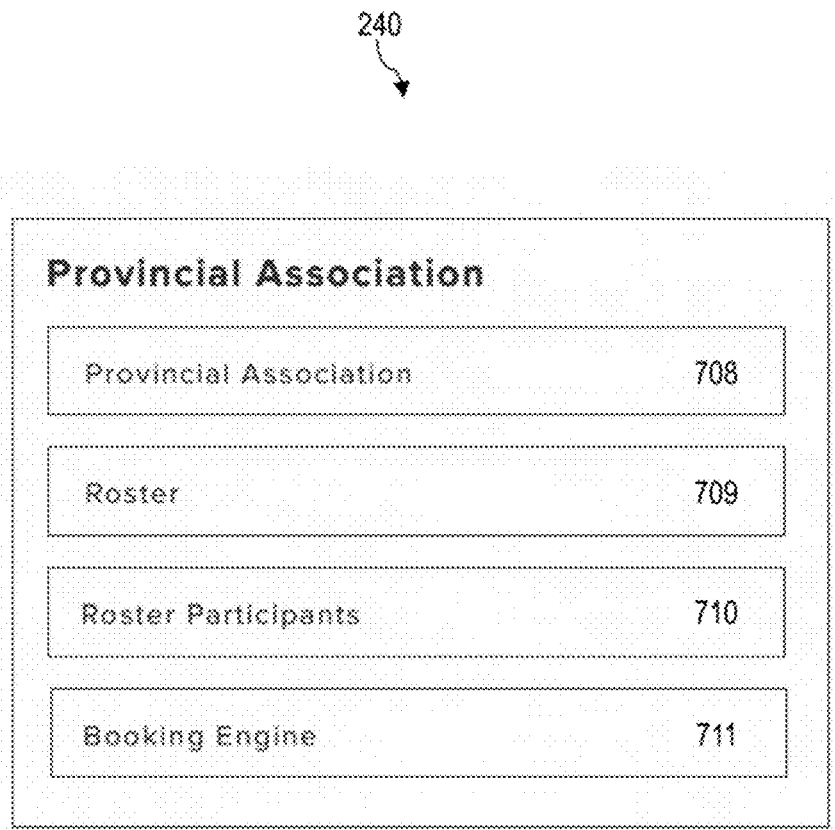
FIG. 2V is an exemplary entry for Provincial Association in the database of FIG. 2B.

FIG. 2V shows an exemplary entry for provincial associations 240 in the database 120. Provincial associations 240 includes provincial associations 708. A provincial association 708 is a level of administrator for the backend system 102.

Provincial associations 240 includes a provincial roster 709. The provincial roster 709 is a list of provincial roster participants 710 that a provincial association 708 may manage. A national association 704 can have any number of provincial rosters 709, each with their own focus, purpose and information. A provincial roster 709 includes provincial roster participants 710.

Provincial associations 240 includes provincial roster participants 710. A roster participant 710 is a single customer 210 that is attached to a provincial roster 709. A provincial roster participant 710 includes: payment details, a status, names, membership details, etc.

Referring to FIGS. 2B and 2V, provincial associations 240 includes provincial a booking engine 711. The booking engine 711 is a unique URL that is used to access tee times from courses 208. The booking engine 711 includes: a title, a URL, and details on which tee times to query. The provincial booking engine 711 also stores which course's tee time should be displayed on the booking engine 711. For example, the booking engine 711 includes "public tee times from Courses A, B and C". Tee Times from Course D will be included in another booking engine 711. A course 208 can belong to multiple booking engines 711. Provincial booking engines 711 are set for a provincial association 708 but are set up by system (i.e. backend system 102) administrators.

Referring back to FIG. 2B, the database 120 stores information pertaining to tee sheets 242. Tee sheets 242 are templates used by course 208 administrators to create an array of tee times for a specific date.

Figure 2W:
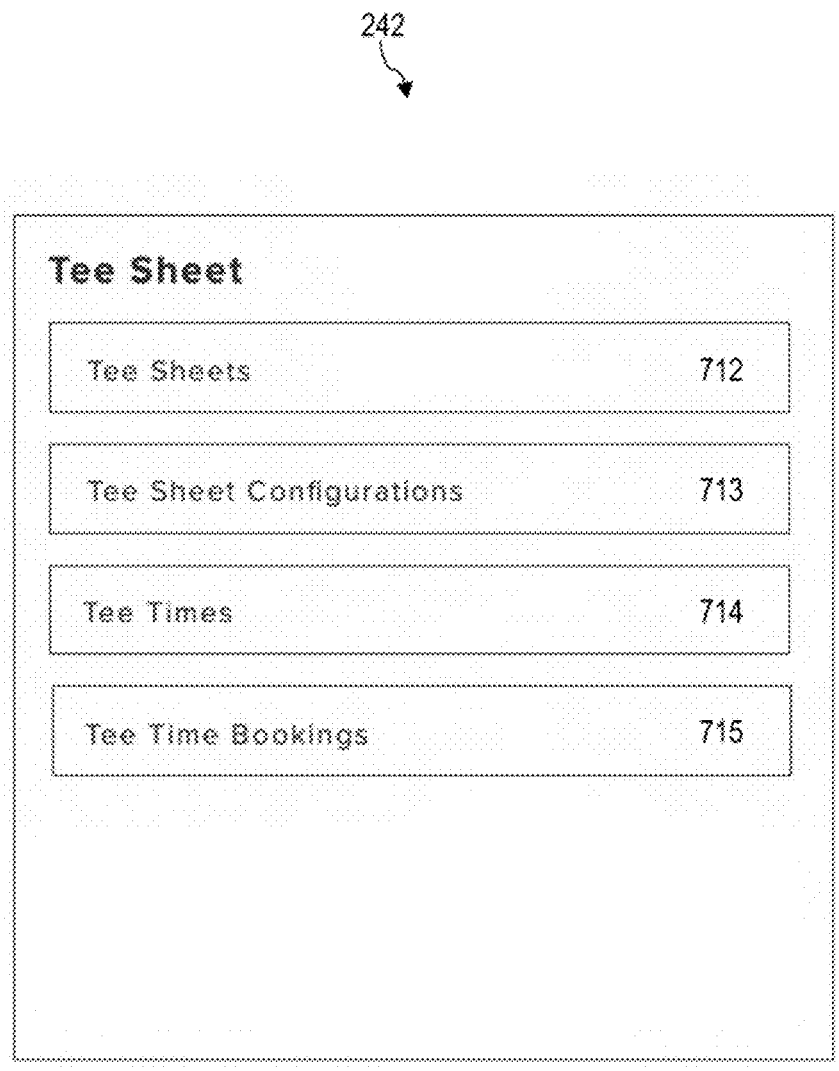
FIG. 2W is an exemplary entry for Tee Sheets in the database of FIG. 2B.

FIG. 2W shows an exemplary entry for tee sheets 242 in the database 120. Tee sheets 242 includes tee sheets 712. Tee sheets 712 are compiled of at least one tee sheet configuration 713 and are a group that holds one or more tee sheet configurations 713. Tee sheets 712 include a title. A tee sheet 712 is attached to a single course 208.

Referring to FIGS. 2B and 2W, tee sheets 242 includes tee sheet configurations 713. Tee sheet configurations 713 are used to determine how tee times 244 are created and set up when a tee sheet 712 is applied to a specific date. Tee sheet configurations 713 are attached to a specific tee sheet 712. A tee sheet configuration 713 includes: a title, an interval, a crossover time (how long it takes to play the 9 holes, stored in minutes) and a division for the tee sheet configuration 713. The tee sheet configurations 713 also include: a first time, and a last time attribute. These time attributes are used to set up the individual start time for each tee time 244.

For example, if the first time is set at 7:00 AM with a 10 minute interval, the configuration 713 will include a tee time at 7:00 AM and then add the interval time and create the next tee time at 7:10 AM. Tee sheet configurations 713 can also be attached to another tee sheet configuration 713. For example, for a tee sheet configuration 713 from 7:00 AM to 12:00 PM on Division A will have a crossover tee sheet configuration 713 from 9:00 AM to 2:00 PM. The first time of a crossover tee sheet configurations 713 is determined by taking the first time of the initial tee sheet configuration 713 and adding in the stored crossover time. Tee sheet configurations 713 also store a reservation type. This is used to determine what type of Tee Time to created within the tee sheet configurations 713. For example, the reservation type includes 'public', 'member', 'public crossover', 'league', 'tournament', etc. If a tee sheet configuration 713 reservation type is set to "league" or "tournament", a league 224 or tournament 254 can be attached. When attached, tee times 244 created with this tee sheet configuration 713 will be directly connected to the league or tournament and only accessible to those league roster participants 653 or tournament roster participants 744.

Referring to FIGS. 2B and 2W, tee sheets 242 includes tee times 714. A tee time 714 is a single time on a specific date that is available for customers 210 to reserve a round of golf. The tee time 714 includes: a start time, a size, and a starting hole. Tee times 714 are attached to a specific course 208 and can be attached to a specific tee sheet configuration 713. The tee time 714 is attached to a specific division (i.e. nine holes of golf; division 611 in FIG. 2F) and can be attached to another tee time 714 that is used for the second 9 holes of the round. There is one tee time 714 for each block of nine holes that are booked or reserved.

Referring to FIGS. 2B and 2W, tee sheets 242 includes tee time bookings 715. A tee time booking 715 is created when a customer 210 books or reserves a specific tee time 714. A tee time booking 715 is created for every 9 holes that a customer books. For example, two separate tee time bookings 715 will be created under the same customer if the customer books 18 holes. The first tee time booking 715 will be created and attached to the initial tee time 714. The second tee time booking 715 will be created and attached to the initial tee time's crossover tee time and will also be attached to the first tee time booking 715. The tee time booking 715 has a start hole string. If a customer books 18 holes, the first tee time booking 715 will have a start hole 18S (18 holes, start) and the second tee time booking 715 will have a start hole 18T (18 holes, turn). If the tee time 714 is attached to a tournament 254 or league 224, the start hole could also display 1A, 2A, 2B, etc for shotgun starts. The tee time booking 715 also has a confirmation number that is accessible by both the customer and course administrator. Tee time booking 715 can be split across multiple customers and a customer can add friends/family members to the booking. By adding other customers, a customer can choose to "split the cost" and have each customer complete and pay for their own attached order.

Figure 2X:
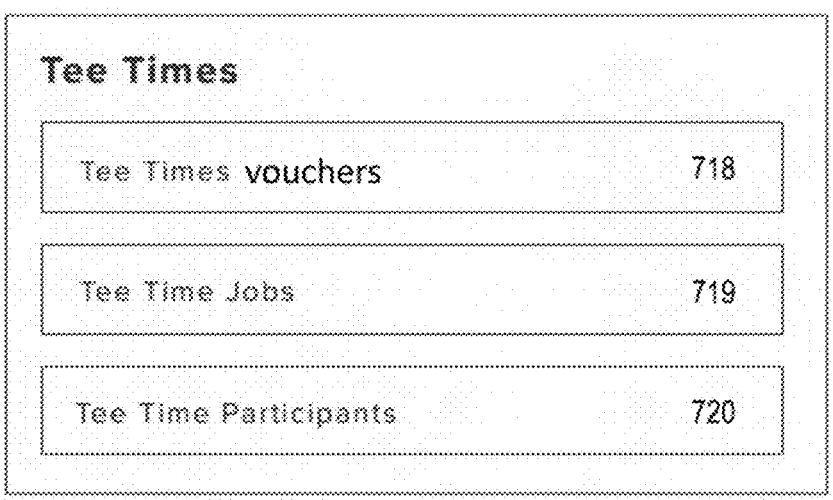
FIG. 2X is an exemplary entry for Tee Times in the database of FIG. 2B.

Referring back to FIG. 2B, the database 120 stores information pertaining to tee times 244. FIG. 2X shows an exemplary entry for tee times 244 in the database 120. Tee times 244 includes tee times vouchers 718. A tee time voucher 718 is pre-payment for a round of golf, and does not connect to a single tee time (i.e. tee time 714 in FIG. 2W). According to another embodiment, a tee time voucher 718 may be an actual tee time on a course's tee sheet (i.e. tee time 714 and tee sheet 712 in FIG. 2W). A customer receives a confirmation with a unique confirmation number that is used to redeem the tee time voucher 718 at the course pro shop. Tee time vouchers 718 include a point value. The point value is the "cost" of the tee time voucher 718 and is equal to the number of customer points 627 required to purchase the tee time voucher 718. The entire point value is displayed, even if the customer has customer points 627 to redeem.

Referring to FIGS. 2B and 2X, tee times 244 includes tee time jobs 719. Tee time jobs 719 are a template that to automatically create a tee time voucher 718. A tee time job 719 includes: a day of the week to run on, a point value for tee time, a description, what is included and a number of days in advance to execute the tee time Job 719. The tee time job 719 is connected to a single course 208.

Tee times 244 includes tee time participants 720. A tee time participant 720 is a record/confirmation of a customer after they have purchased a tee time voucher 718. The tee time participant includes: a confirmation number, a date of purchase and an expiry date. Tee time participants 720 are connected to a single customer 210. The tee time participant 720 has a quantity attribute determining the number of golfers the customer has paid for.

Referring back to FIG. 2B, the database 120 stores information pertaining to tickets 246. Tickets 246 are prepaid green fees and deals that are purchased on the online marketplace. Unlike tee times 244, tickets 246 are not attached to a specific date, but must be used before an expiry date.

Figure 2Y:
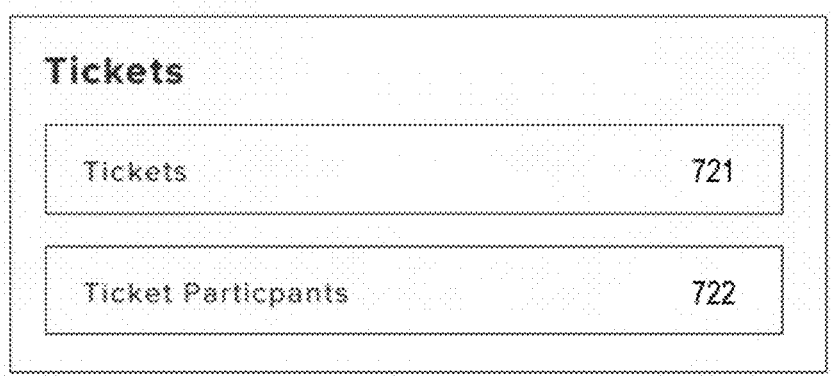
FIG. 2Y is an exemplary entry for Tickets in the database of FIG. 2B.

FIG. 2Y shows an exemplary entry for tickets 246 in the database 120. Tickets 246 includes tickets 721. Tickets 721 can be used to sell any kind of deal. For example, a deal includes 'Two Players and a Cart', 'Four Players including golf cart and lunch', etc. Tickets 721 can be created by a backend system 102 administrator or a course 208 administrator. Tickets 721 include: an expiry date, a name, a description of the deal, etc. Tickets 721 have terms and restrictions set by the course, on when the ticket 721 can be redeemed.

Tickets 246 includes ticket participants 722. A ticket participant 722 is an individual ticket 721 that has been created for a customer. The ticket participant 722 contains a unique serial number and barcode use to redeem at one of the valid courses. A ticket participant 722 is a mirror image (aside from the barcode and number) of the ticket 721 it was created from.

Referring to FIG. 2B, the database 120 stores information pertaining to coupons 248.

Referring to FIG. 2B, the database 120 stores information pertaining to tour events 252. A tour events 252 is a type of tournament 254 that is created within the backend system 102. The tour event 252 is attached to a specific tour 256. A tour event 252 is created by a tour 256 and accessible by the course 208 and course administrator that it is being hosted at. A tour 256 administrator can allow the tour event 252 to be edited directly by a course 208 and course administrator.

Courses 208 can always view a tour event 252 but cannot edit anything unless provided privilege from the tour 256 and tour administrator.

Figure 2Z:
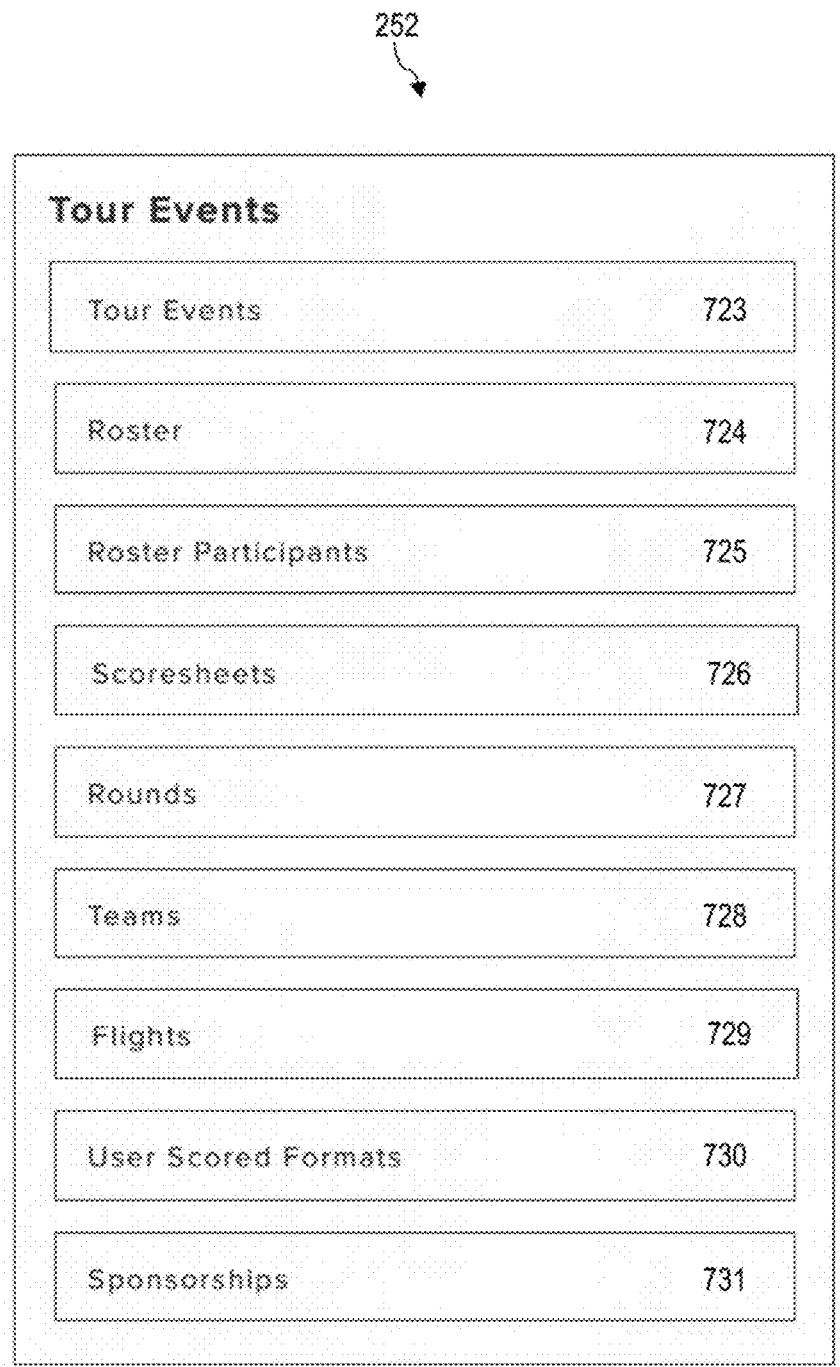
FIG. 2Z is an exemplary entry for Tour Events in the database of FIG. 2B.
Figure 2B:

FIG. 2Z shows an exemplary entry for tour events 252 in the database 120.

Tour events 252 includes a tour roster 724. The tour roster 724 is a list of tour roster participants 725. The tour roster 724 is used for an overview of the players or participants 725 that will be attending the tour event 723. The tour roster 724 includes a registration type and a payment status for participants 725 on the tour roster 724.

Tour events 252 includes tour roster participants 725. A tour roster participant 725 is a single customer that has registered for the tour event 723. A tour roster participant 725 includes: a financial status, a tour team 728, a preferred tee deck, orders, notes, a number of guests, tags and a registration number. When a new tour roster participant 725 is added to a tour event 723, a customer collect 621 record is created for the customer 210 and the client 202.

Tour events 252 includes tour scoresheets 726. Tour scoresheets 726 are created to hold an array of tour rounds 727. A tour scoresheet 726 is set up for each tour round 727. For example, if the tour event 723 has 2 rounds, the tour event 723 would have 2 tour scoresheets 726. The tour scoresheet 726 is created by a course administrator or tournament convenor 738. The tour scoresheet 726 includes the one or two divisions (i.e. groups of 9 holes) that are being played, a date of the tour scoresheet 726, a name, a scoring method, a scoring option.

Tour events 252 includes tour rounds 727. Tour rounds 727 are a round of golf that is posted by a tour team 728 within a tour scoresheet 726. The tour round 727 is a round that contains 9 or 18 holes scores for one tour team 728, regardless of the number of tour roster participants 725 within the tour team 728.

Tour events 252 includes tour teams 728. A tour team 728 is a group of tour roster participants 725 set up within a tour event 723. A tour team 728 includes: a number of tour roster participants 725 and a name for the team. Tour teams 728 can be added to a tour flight 729.

Tour events 252 includes tour flights 729. Tour flights 729 are a group of tour roster participants 725 or a group of tour teams 728. Tour flights 729 include: a name, a minimum handicap index and a maximum handicap index. If a tour flight 729 is made up of multiple tour roster participants 725, the tour flight 729 can be auto generated based and tour roster participants' 725 Handicap Index. The backend system 102 will assign a tour roster participant 725 to a tour flight 729 is their Handicap Index falls within the tour flight 729 min/max handicap index numbers.

Tour events 252 includes tour user scored formats 730. Tour user scored formats 730 are games, contests, etc., that are run for a tour event 723 where a winner is decided regardless of a score. Tour user scored formats 730 may be a closest to the pin contest, longest drive contest, etc. Tour user scored formats 730 include: a name, a prize, a hole the contest is on, etc. A tour user scored formats 730 is directly attached to a tour scoresheet 726.

Tour events 252 includes tour sponsorships 731. A tour sponsorship 731 is a name and/or logo of a company that is sponsoring a tour event 723. Tour sponsorships 731 are added and uploaded within the tour event 723 by the course administrator. Tour sponsorships 731 are displayed on cart signs, scorecards, registration pages, etc.

Referring to FIG. 2B, the database 120 stores information pertaining to tournaments 254. A tournament 254 is a golf event that is being hosted at a course 203.

FIG. 2AA shows an exemplary entry for tournaments 254 in the database 120. Tournaments 254 includes tournaments 732. Tournaments 732 includes: a name, a start time, a registration deadline, a type of tournament and a handle that is used to generate a tournament specific URL. Tournaments 732 also include scoring settings, for example, a scoring method, a scoring option, a number of holes and a tee deck.

Referring to FIG. 2AA, tournaments 254 includes a tournament roster 733. The tournament roster 733 is a list of tournament roster participants 744. The tournament roster 733 is used for an overview of the players or participants 744 that will be attending the tournament 732. The tournament roster 733 includes a registration type and a payment status for participants 744 on the tournament roster 733.

Referring to FIG. 2AA, tournaments 254 includes tournament registration fees 734. Tournament registration fees 734 are options that a customer can select when registering for a tournament 732. Tournament registration fees 734 are attached to a specific product and product variant (i.e. product 695 and product variant 696 in FIG. 2T), which is used within an order 230. Tournament registration fees 734 are attached to a specific tournament 732. The tournament registration fee 734 is for a specified number of players that are required to be entered at registration. The tournament registration fee 734 can be one of two types - a "Registration Fee" or an "Add-on." When registering for a tournament 732, a customer can only select one (1) tournament registration fee 734 with type "Registration Fee", but can select one or more tournament registration fees 734 with type "Add-on."

The tournament registration fee 734 also includes a set of default tags. The default tags are added to the tournament roster participant 744 when their order 681 is completed. These tags includes information about the tournament registration fee 734 or what is included. For example, the tags may be "Golfer", "Meal Only", "Includes Cart", etc. The tournament registration fee 734 also has the option to allow guests or not. If enabled, the customer completing the registration must include the other players required in the registration fee Number of Players attribute. If disabled, the customer does not have to include the other player's information.

Referring to FIGS. 2B and 2AA, tournaments 254 includes tournament invoices 735. Tournament invoices 735 are orders 230 within a tournament 732 that does not require payment upfront. These orders 230 can be marked as 'Pending' while the course administrator is awaiting payment from the customer. Tournament invoices 735 are connected to a single tournament 732 and a single order 681.

Referring to FIG. 2AA, tournaments 254 includes tournament announcements 736. Tournament announcements 736 are posted that are posted to a tournament 732 by a course administrator or tournament convenor 738. Tournament announcements 736 are attached to a specific tournament 732. Tournament announcements 736 can be sent to tournament roster participants 744 via email.

Referring to FIG. 2AA, tournaments 254 includes contracts 737. Tournament contracts 737 are a PDF document uploaded by a course administrator. Tournament contracts 737 are attached to a specific tournament 732. Tournament contracts 737 must be accepted by a course administrator and the default tournament convenor 738. Tournament contracts 737 can be emailed directly to the default tournament convenor 738. Tournament contracts 737 can be accepted by the default tournament convenor 738 directly in their email. Course administrator can attach a specific tournament deposit to a tournament contract 737. By attaching a tournament deposit to the tournament contract 737, it will require the tournament convenor 738 to pay the tournament deposit online, before the tournament contract 737 can be accepted.

Tournament deposits are a deposit but attached to a specific tournament 732. Tournament deposits are deposits that a course administrator can create to receive payment from a customer without creating an initial order 681 or a tournament invoice 735. Tournament deposits can be connected to a tournament contract 737. If a tournament deposit is connected to a tournament contract 737, the tournament deposit must be paid before the tournament contract 737 can be accepted. Tournament deposits have a due date which is the date the customer must pay the full deposit amount. Tournament deposits can be send to the customer via email where the customer can click a link and pay the deposit using their credit card.

Referring to FIG. 2AA, tournaments 254 includes tournament convenors 738. Tournament convenors 738 are customers 210 that are attached to a tournament 732 and given privileges to manage and edit said tournament 732. A tournament 738 can have multiple tournament convenors 738 but must have a default tournament convenor 738.

Tournaments 254 includes tournament draw sheets 739. Tournament draw sheets 739 contain an array of tournament draw sheet groups 740 and are an organization tool for a course administrator and tournament convenor 738 to manage tournament roster participants 744 and their starting holes. The tournament draw sheet 739 includes a start time and is attached to a specific tournament 732.

Tournaments 254 includes tournament draw sheet groups 740. A tournament draw sheet group 740 is a group within a tournament draw sheet 739. A tournament draw sheet group 740 includes a start time or a tee time of the group, a starting hole, a Division of the group. The tournament draw sheet group 740 also have a Sponsorship Name and a Sponsorship URL where a logo can be uploaded.

Tournaments 254 includes tournament draw sheet group members 741. The tournament draw sheet group member 741 is a record of a single tournament roster participant 744 within a tournament draw sheet group 740. The tournament draw sheet group member 741 is attached to a specific tournament draw sheet group 740 and a tournament draw sheet 739. The tournament draw sheet group member 741 also stores the tournament roster participant 744 name. A tournament draw sheet group member 741 can also store the name of a company or sponsorship 748.

Tournaments 254 includes tournament user scored formats 742. Tournament user scores formats 742 are games, contests, etc., that are run for a tournament 732 where a winner is decided regardless of a score. Tournament user scores formats 742 may be a closest to the pin contest, longest drive contest, etc. Tournament user scored formats 742 include: a name, a prize, a hole the contest is on, etc. A tournament user scored format 742 is directly attached to a tournament scoresheet 743.

Tournaments 254 includes tournament scoresheets 743. Tournament scoresheets 743 are created to hold an array of Tournament Rounds. A tournament scoresheet 743 is set up for each round. For example, if the tournament 732 has 2 rounds, the tournament 732 would have 2 tournament scoresheets 743. The tournament scoresheet 743 is created by a course administrator or tournament convenor 738. The tournament scoresheet 743 includes the one or two Divisions that are being played, a date of the tournament scoresheets 743, a name, a scoring method, a scoring option.

Tournaments 254 includes tournament roster participants 744. A tournament roster participant 744 is a single customer that has registered for the tournament 732. A tournament roster participant 744 includes: a financial status, a tournament team 745, a preferred tee deck, orders, notes, a number of guests, tags and a registration number. When a new tournament roster participant 744 is added to a tournament, a customer collect 621 record is created for the customer 210 and the client 202.

Tournaments 254 includes tournament teams 745. A tournament team 745 is a group of tournament roster participants 744 set up within a tournament 732. A tournament team 745 includes: a number of tournament roster participants 744 and a name for the team. Tournament teams 745 can post tournament team rounds 747 within tournament scoresheets 743. Tournament teams 745 can be added to a tournament flight 746.

Tournaments 254 includes tournament flights 746. Tournament flights 746 are a group of tournament roster participants 744 or a group of tournament teams 745. Tournament flights 746 include: a name, a minimum handicap index and a maximum handicap index. If a tournament flight 746 is made up of multiple tournament roster participants 744, the tournament flight 746 can be auto generated based and tournament roster participants' 744 Handicap Index. The system (i.e. backend system 102) will assign a tournament roster participant 744 to a tournament flight 746 is their Handicap Index falls within the tournament flight 746 min/max handicap index numbers.

Tournaments 254 includes tournament team rounds 747. Tournament team rounds 747 are a round of golf that is posted by a tournament team 745 within a tournament scoresheet 743. Tournament team rounds 747 is a round that contains 9 or 18 holes scores for one tournament team 746, regardless of the number of tournament roster participants 744 within the team 746 (ex. a scramble tournament will have tournament teams 745 posting one team round 747).

Tournaments 254 includes tournament sponsorships 748. Tournament sponsorship 748 is a name and/or logo of a company that is sponsoring a tournament 732. Tournament sponsorships 748 are added and uploaded within the tournament 732 by the course administrator or the tournament convenor 738. Tournament sponsorships 748 are displayed on cart signs, scorecards, registration pages, etc.

Tournaments 254 includes tournament skins sheets 749. A tournament skins sheet 749 is a single skins sheet that is created within a tournament scoresheet 743. The tournament skins sheet 749 includes one or more tournament skin sheet rounds 750. Tournament skins sheets 749 determine the lowest score without ties on any particular hole within the round. The lowest score can be determined by either the gross scores or net scores. Tournament skins sheet rounds 750 includes: a title, a minimum course handicap, a maximum course handicap, a front nine Division and a back nine Division. A tournament skins sheet round 750 can also contain a limit on the number of strokes that are awarded on a single hole if the tournament skins sheet 749 is being determined by net score.

Tournaments 254 includes tournament skin sheet round 750. A tournament skin sheet round 750 is a team round 747 that has been added to a tournament skins sheet 749. The team round 747 can be added to multiple tournament skins sheets 749, therefore creating multiple tournament skins sheet rounds 750.

Tournaments 254 includes tournament participant meta fields 751. Tournament participant meta field 751 are fields created within a tournament 732 to collect customizable information for tournament roster participants 744. For example, a tournament wants to collect a player's shirt size when the player registers. A tournament 732 can have any number of tournament participant meta fields 751. Tournament participant meta fields 751 can be hidden and entered only by the course administrator or tournament convenor 738, or they can be displayed on the tournament registration where customers are required to fill in the information. Tournament participant meta fields 751 can either be an input where customers can enter in any information, or a dropdown where they can only select for a list of options. Options for a dropdown are set by the course administrator or tournament convenor 738 when the tournament participant meta field 751 is created.

Tournaments 254 includes tournament participant meta 752. Tournament participant meta 752 is created for a specific tournament roster participant 744 and tournament participant meta field 751. For example, tournament participant meta 752 may store a title called 'Size' and a value called 'Medium' for a tournament participant meta field 751 that is collecting a tournament roster participant's 744 shirt size.

Referring back to FIG. 2B, the database 120 stores information pertaining to tours 256. FIG. 2BB shows an exemplary entry for tours 256 in the database 120. Tours 256 include tours 753. A tour 753 is an organization that runs a series of tournaments 254. The tour 753 belongs to a client 202. The tour 753 has a tour administrator that can access the system (i.e. backend system 102) to manage the tour 753, customers 210, memberships 228, etc.

Tours 256 includes tour memberships 754. Tour memberships 754 are a set of privileges for a tour 753. Tour memberships 754 are purchased by customers 210.

Tours 256 includes a tour roster 755.

Referring to FIG. 2B, the database 120 stores deposits 258. Deposits 258 may be created by a course administrator to receive a payment from a customer without creating an initial order 681 with order line items 682. A deposit 258 includes: a deposit amount that is being collected, and a due date. Deposits 258 can be connected to a tournament 254 or hospitality event 220 if needed, or they stand alone. A deposit 258 will have one or more deposit transactions that record the payment of the deposit 258. The deposit 258 is attached to a specific account. The deposit 258 is attached to a single customer 210. Deposits 258 can be sent to the customer via email where the customer can click a link and pay the deposit 258 using their credit card.

Deposits transactions are a record of payment for a deposit 258. A deposit transaction includes: an amount paid, a type of transaction (credit card, check, e transfer, etc.), and a currency. A deposit transaction is connected to a single deposit 258.

Referring back to FIG. 2A, the backend system 102 is a computerized system and includes a computer processor 160 operably coupled to a memory 162. The memory 162 may be any volatile or non-volatile memory or data storage components including random access memory (RAM), read-only memory (ROM), hard disk drives, solid state drives, USB flash drives, memory cards accessed via a memory card reader, optical discs accessed via an optical disc drive, or a combination of any two or more of these memory components.

The memory 162 stores a plurality of instructions that are executable by the processor 160. In this respect, the term "executable" means a program file that is in a form that can ultimately be run by the processor 160. Examples of executable programs may be, for example, a compiled program that can be translated into machine code in a format that can be loaded into a random access portion of the memory 162 and run by the processor 160, source code that may be expressed in proper format such as object code that is capable of being loaded into a random access portion of the memory 162 and executed by the processor 160, or source code that may be interpreted by another executable program to generate instructions in a random access portion of the memory 162 to be executed by the processor 160, etc.

The memory 162 stores conversion criteria 164. The conversion criteria 164 is a set of processor-executable instructions for automatically converting a currency value for each tee time 714, tee time voucher 718 and ticket 721 to a point value that will be displayed as the cost. For example, when a course or client administrator creates a new deal (i.e. a tee time 714, tee time voucher 718 or ticket 721), the administrator will enter a dollar value for the deal, for example, $50. The conversion criteria 164 automatically converts the dollar value into a point value, for example, 100 points. The point value is displayed as the cost for the deal in the online marketplace 136.

The conversion criteria 164 may include instructions to convert a value in a particular currency and any associated taxes for the country/province/region to a point value. Similarly, a discount in a particular currency may be into converted into a points value according to the conversion criteria 164. Thus, the conversion criteria 164 is essentially an exchange rate for converting a real currency into points and vice-versa.

The conversion criteria 164 may be specifically set for a particular currency and the conversion criteria 164 may be different for different currencies. The conversion criteria 164 is typically set by a backend administrator of the system 100, so that the same conversion criteria 164 is applicable to all clients and courses that use the system 102 (i.e. clients 202 and courses 208 in FIG. 2B). A further advantage of the conversion criteria 164 is that it may provide a functional improvement to system 102 resource usage (i.e. memory 162 and processor 160) by providing a normalized points currency to ensure rate integrity, rather than requiring the system 102 to convert between different currencies used by different courses and clients in different countries, provinces or regions. In particular, the conversion criteria 164 abrogates the need for the system 102 to store and/or update various currency exchange rates.

The memory 162 stores comparison criteria 166. The comparison criteria 166 is a set of processor-executable instructions for comparing the cost of a deal (i.e. a tee time 714, a tee time voucher 718 or a ticket 721) to a customer point balance 627. The comparison criteria 166 also includes instructions for determining a difference between the cost of the deal and the customer point balance 627.

The memory 162 stores pricing criteria 168. The pricing criteria 168 is a set of processor-executable instructions for automatically applying additional fees or discounts to a deal (i.e. a tee time 714, a tee time voucher 718 or a ticket 721). Additional fees include, for example, booking and processing fees for non-members. Discounts include, for example, course privileges 675 attached to memberships 228. For example, if a customer books a deal at a particular golf course and the customer is a member of the golf course, the pricing criteria 168 may apply a 25% discounted booking fee for members.

The memory 162 stores posting criteria 170. The posting criteria 170 is a set of processor-executable instructions for posting tee times 714 and tee time vouchers 718 to the online marketplace 136. The posting criteria 170 is applied to tee time jobs 719 and tee sheets 712 to post tee time vouchers 718 and tee times 714, respectively. According to an embodiment, the posting criteria 170 includes instructions to post tee time vouchers 718 to the online marketplace 136 for the tee time jobs 719 created and stored on the backend system 102 within the past 24 hours. According to an embodiment, the posting criteria includes instructions to post tee times 714 to the online marketplace 136 based on a tee sheet 712. A change to the tee sheet 712 will result in a corresponding change to the posted tee time 714. The posting criteria 170 further includes instructions to remove posted tee times 714 and tee time vouchers 718 if they are not purchased by an expiry date.

The memory 162 stores reward criteria 172. The reward criteria 172 is a set of processor-executable instructions for allocating points as part of a loyalty program for transactions such as purchasing tee times 714 or tickets 721. Points may be allocated based on, for example: the point value for tee time 714 or ticket 721 purchased; the membership 672 or membership type 673 of the customer; the privileges 675, membership add-ons 676 of the customer. Reward points that earned are added to the customer point balance 627 and tracked in the customer point log 628.

The memory 162 stores search criteria 174. The search criteria 174 is a set of processor-executable instructions for searching or filtering deals (i.e. a tee time 714, tee time voucher 718 or ticket 721) in the online marketplace 136. The search criteria 174 may be configured according to, for example, the memberships 228 of the customer so that only the deals at membership courses are presented. The search criteria 174 may be input by a customer 210 via an application running on a customer device (i.e. applications 116, 118 running on customer devices 104, 106 in FIG. 1).

The memory 162 stores score tracking criteria 176. The score tracking criteria 176 is a set of processor-executable instructions for tracking scores of players during a round of golf. For example, the score tracking criteria 176 includes instructions to store scores entered by a customer 210 via an application running on a customer device (i.e. applications 116, 118 running on customer devices 104, 106) in the database 120 under a league scoresheet 652, a league skin sheet 658, a tournament scoresheet 743, or a tournament skin sheet 749.

The memory 162 stores schedule creation criteria 178. The schedule creation criteria 178 is a set of processor-executable instructions for creating tournament flights 746, league flights 655, and inter club league matches 638. For example, the schedule creation criteria 178 includes instructions for grouping participants in a tournament based on their handicap. According to an embodiment, the schedule creation criteria 178 includes instructions for grouping participants randomly.

The memory stores payment criteria 180. The payment criteria 180 is a set of processor-executable instructions for allocating electronic funds paid by a customer for a deal (i.e. a tee time 714, tee time voucher 718 or ticket 721), a membership or a product 236 sold on the online marketplace 136. For example, the payment criteria 180 may include instructions to allocate 50% of the payment received to a course 208 and 50% to the provincial association 240. The payment criteria 180 may include instructions for the backend system 102 to connect to, and exchange information with an external payment platform (e.g., Stripe) to receive and allocate the payment.

Referring back to FIG. 1, in an exemplary operation of system 100, a client/course administrator (i.e., an employee of a golf course or golf association) uses the web application 114 running on the administrator device 112 to create a pending job for a deal (whether for a tee time or a ticket). The pending deal is stored by the backend system 102. The backend system 102 automatically creates a tee time or ticket from the pending job. A customer (i.e., an individual golfer) may then use the mobile application 118 running on the customer device 106 to search for available tee times or tickets and make a booking. The following methods describe the creation and storing of tee times and tickets from pending jobs.

Figure 3A:
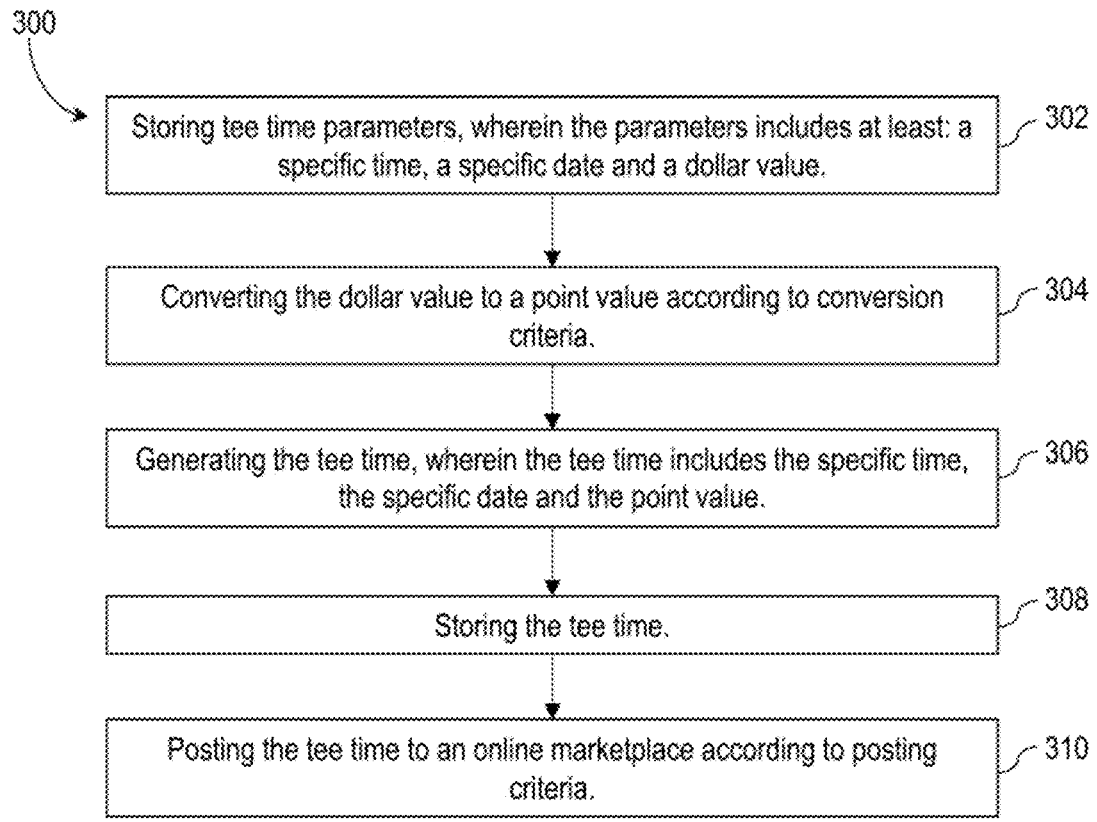
FIG. 3A is a flow chart of a method for creating tee time deals, according to an embodiment.

Referring to FIG. 3A illustrated therein is a flow chart of a method 300 for creating tee times 714, according to an embodiment. The method 300 may be performed by the components and devices in FIGS. 1, 2A and 2B. The elements from FIGS. 1, 2A and 2B are identified in parenthesis for reference.

At 302, tee time parameters are stored in the database (120). The parameters includes at least: a specific time, a specific date and a dollar value. The parameters for the tee time may include other information such as a location, a posting date and a membership (126) requirement. The parameters and other information may be entered by an administrator via a web application (114) running on an administrator device (112) and be received by the backend system 102 and stored as a tee time (714). The parameters may be included in a tee sheet 712.

At 304, the dollar value for the tee time (714) is converted to a point value according to conversion criteria (164). The conversion criteria (164) defines an "exchange rate" to convert the dollar value to the point value. In this manner, the actual price (i.e., the dollar value) for the tee time (714) is masked to preserve rate integrity. That is, the dollar value of the tee time (714) is not shown to a customer when the tee time (714) is posted on an online marketplace; the customer will only see the point value as a purchase price for the tee time (714).

At 306, the tee time (714) is generated. The tee time (714) includes the specific time and the specific date (and posting date, if included), stored at Act 302, and the point value converted at Act 304.

At 308, the tee time (714) is stored in the database (120).

At 310, the tee time (714) is posted to an online marketplace (136) that is viewable to customers via an application (116, 118) running on a customer device (104, 106). The tee time (714) is posted upon execution of posting criteria (170). For example, if the tee time (714) includes a posting date that has not yet passed, the tee time (714) will continue to be stored and not posted until the posting date is reached.

Preferably, Acts 302, 304, 306, and 308 are performed at least once a day, for example at midnight, so that all pending jobs (152) for tee times (156) received in the preceding 24 hours may be processed. According to other embodiments, Acts 304, 306 and 308 may be performed immediately following Act 302 in real-time.

Figure 3B:
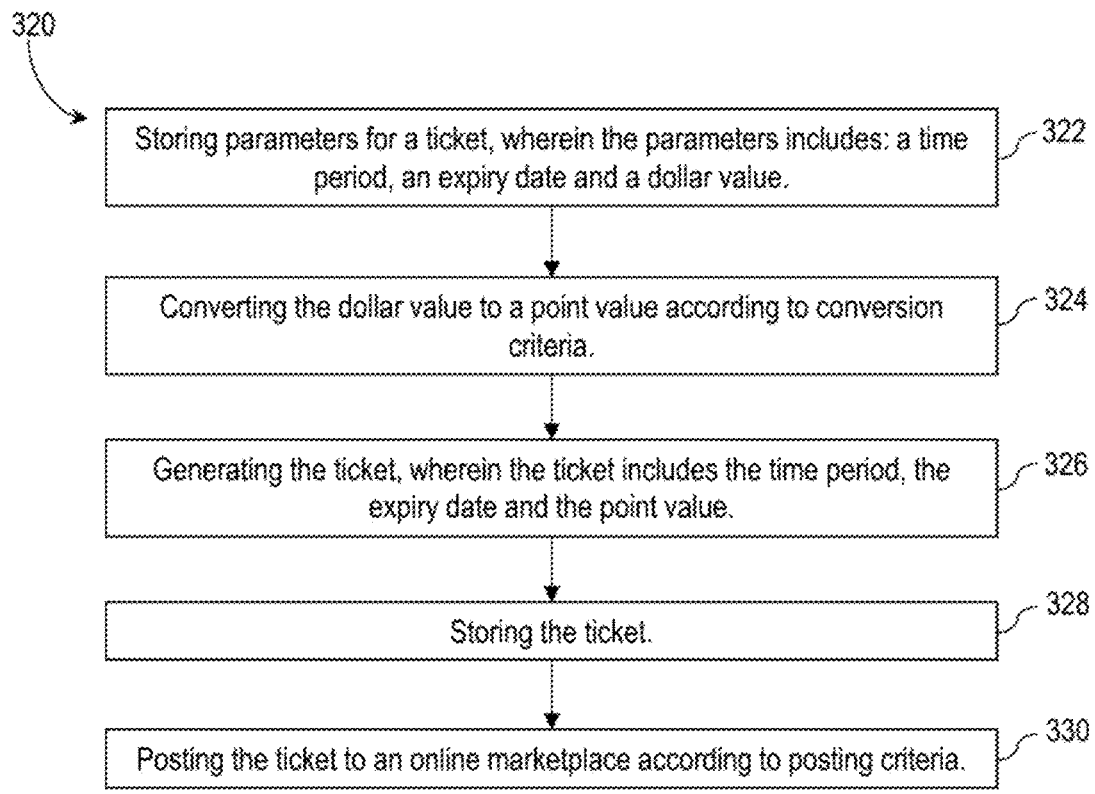
FIG. 3B is a flow chart of a method for creating ticket deals, according to an embodiment.

Now referring to FIG. 3B illustrated therein is a flow chart of a method 320 for creating tickets 721, according to an embodiment. The method 320 may be performed by the components and devices in FIGS. 1, 2A and 2B. The elements from FIGS. 1, 2A and 2B are identified in parenthesis for reference.

At 322, parameters for a ticket (721) is stored in the database (120). The parameters include at least a time period, an expiry date and a dollar value. The parameters may include other information such as a location, a posting date and a membership requirement. The time period, expiry date, dollar value and other information may be entered by an administrator via a web application (114) running on an administrator device (112) and be received by the backend system 102.

At 324, the dollar value is converted to a point value according to conversion criteria (164). The conversion criteria (164) defines an "exchange rate" to convert the dollar value to the point value. In this manner, the actual price (the dollar value) for the ticket (721) is masked to preserve rate integrity.

At 326, the ticket (721) is generated. The ticket (721) includes the time period and expiry date (and posting date, if included), from the parameters, stored at Act 322, and the point value converted at Act 304.

At 328, the ticket (721) is stored in the database (120).

At 330, ticket (721) is posted to an online marketplace (136) that is viewable to customers via an application (116, 118) running on a customer device (104, 106). The ticket (721) is posted upon execution of posting criteria (170). For example, if the ticket (721) includes a posting date that has not yet passed, the ticket (158) will continue to be stored and not posted until the posting date is reached. If the ticket (721) is not purchased, by the expiry date, it is removed from the online marketplace according to the posting criteria (170).

Preferably, Acts 324, 326 and 328 are performed at least once a day, for example at midnight, such that all pending jobs (152) for tickets (158) created in the preceding 24 hours may be processed. According to other embodiments, Acts 324, 326 and 328 may be performed immediately following Act 322 in real-time.

Referring back to FIG. 2A, the backend system 102 can be used to administer the online marketplace 136 and a loyalty program. Loyalty programs using points-for-dollars schemes are popular and provide incentive for customers to make purchases and earn points which can be redeemed for rewards, or used in combination with real money, to make future purchases. With regard to the rewards that can be redeemed, the rewards are often valued in points, opposed to dollars. An advantage of valuing rewards in points, opposed to dollars is that the actual price of the reward is masked and rate integrity is preserved. Masking the actual price enables different customers to pay different prices for the same booking, depending on, for example, the customer's memberships 228, customer points balance 627, etc. A further advantage is that taxes and fees can be a converted from dollars to point values so that the end price may be paid in points. These and other advantages are demonstrated by the following method.

Figure 4A:
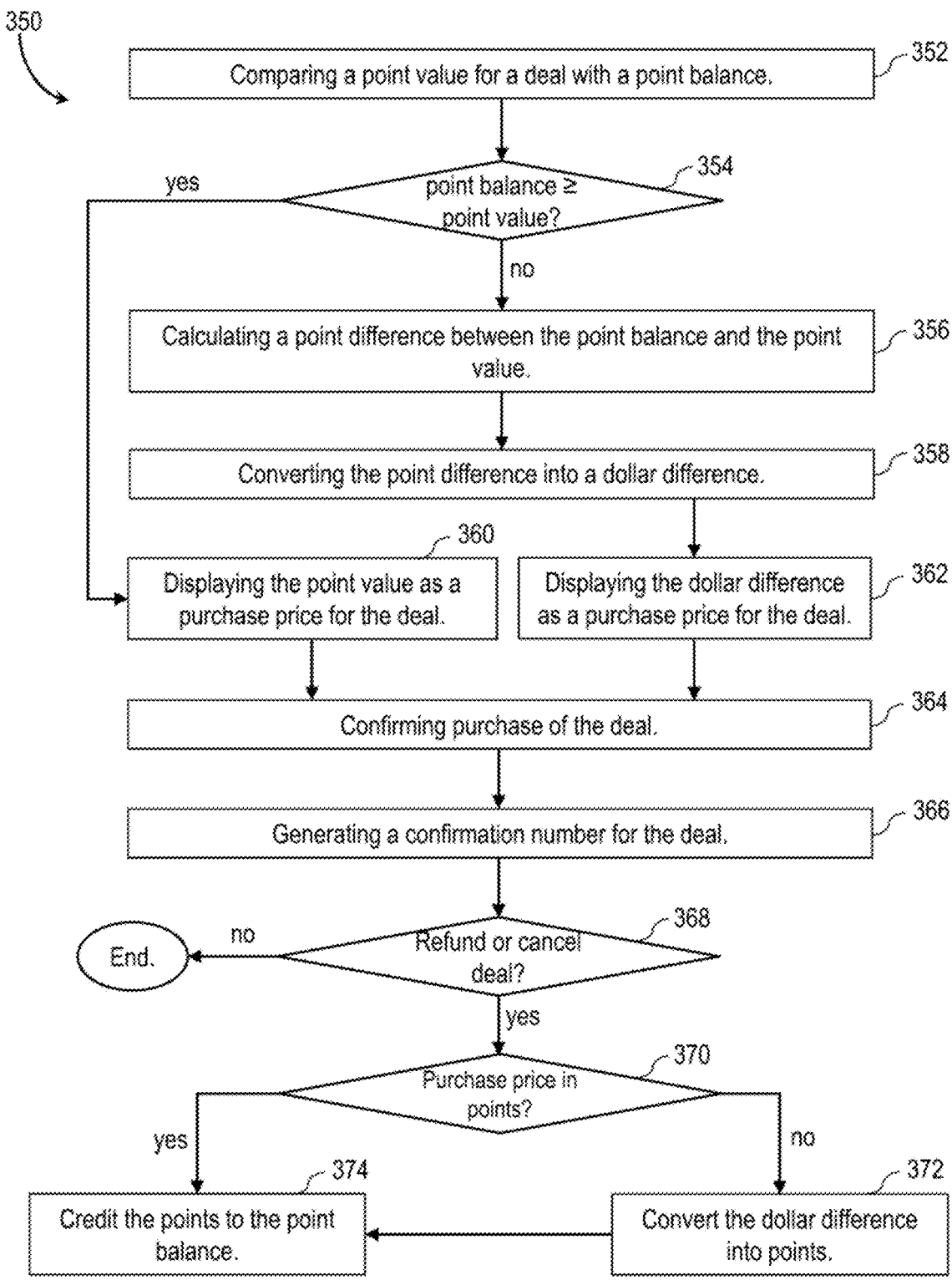
FIG. 4A is a flow chart of a method for setting the purchase price for a deal, according to an embodiment.

Referring to FIG. 4A, illustrated therein is a method 350 for setting the purchase price for a deal, according to an embodiment. The method 350 allows for the purchase to be made using electronic payment of funds, or using reward points, or a combination of both. If the deal is cancelled or otherwise not used, the method 350 allows for a refund or partial refund in the form of loyalty points. The method 350 may be performed by the components and devices in FIGS. 1 and 2. The elements from FIGS. 1 and 2 are identified in parenthesis for reference.

At 352, a point value for a deal (i.e. a tee time 714, tee time voucher 718 or ticket 721) is compared with a customer point balance (627). The point value is a single amount that includes all applicable rates, taxes, fees and discounts for the deal. For example, the point value is inclusive of the dollar value and any additional fees and taxes as stipulated by the pricing criteria (168). The point value may also be inclusive of any discount or privileges associated to a membership (228) the customer has. The customer point balance (627) is associated to the customer who is shopping for the deal. The deal is posted to an online marketplace (136) that is viewable to customers via an application (116, 118) running on a customer device (104, 106). The deal may be searched according to search criteria (174) entered by the customer.

Figure 4B:
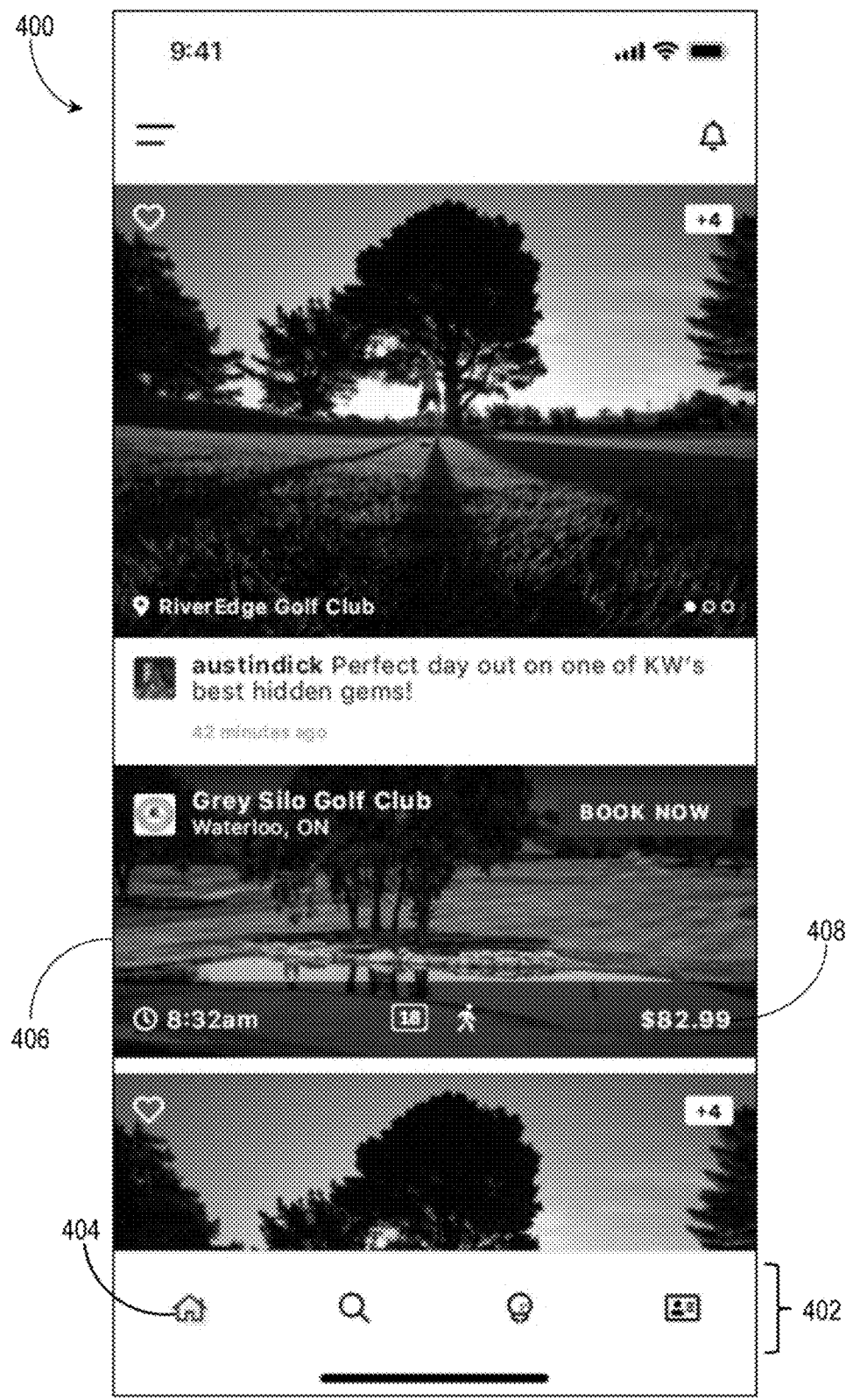
FIG. 4B is an exemplary screenshot of a homepage of a mobile application running on a customer device, according to an embodiment.

Now referring to FIG. 4B, shown therein is an exemplary screenshot of a homepage 400 of a mobile application running on a customer device, according to an embodiment. The mobile application and customer device may be the mobile application 118 and the customer device 106, respectively shown in FIG. 1. The mobile application includes a plurality of softkey navigation buttons 402, including a home button 404, for navigating between different pages within the application. For example, a touch gesture on the home button 404, will cause the application to display the homepage 400. The homepage 400 also displays a plurality of content including one or more deals 406. The deal 406 may be a tee time or a ticket available on the online marketplace.

Figure 4C:
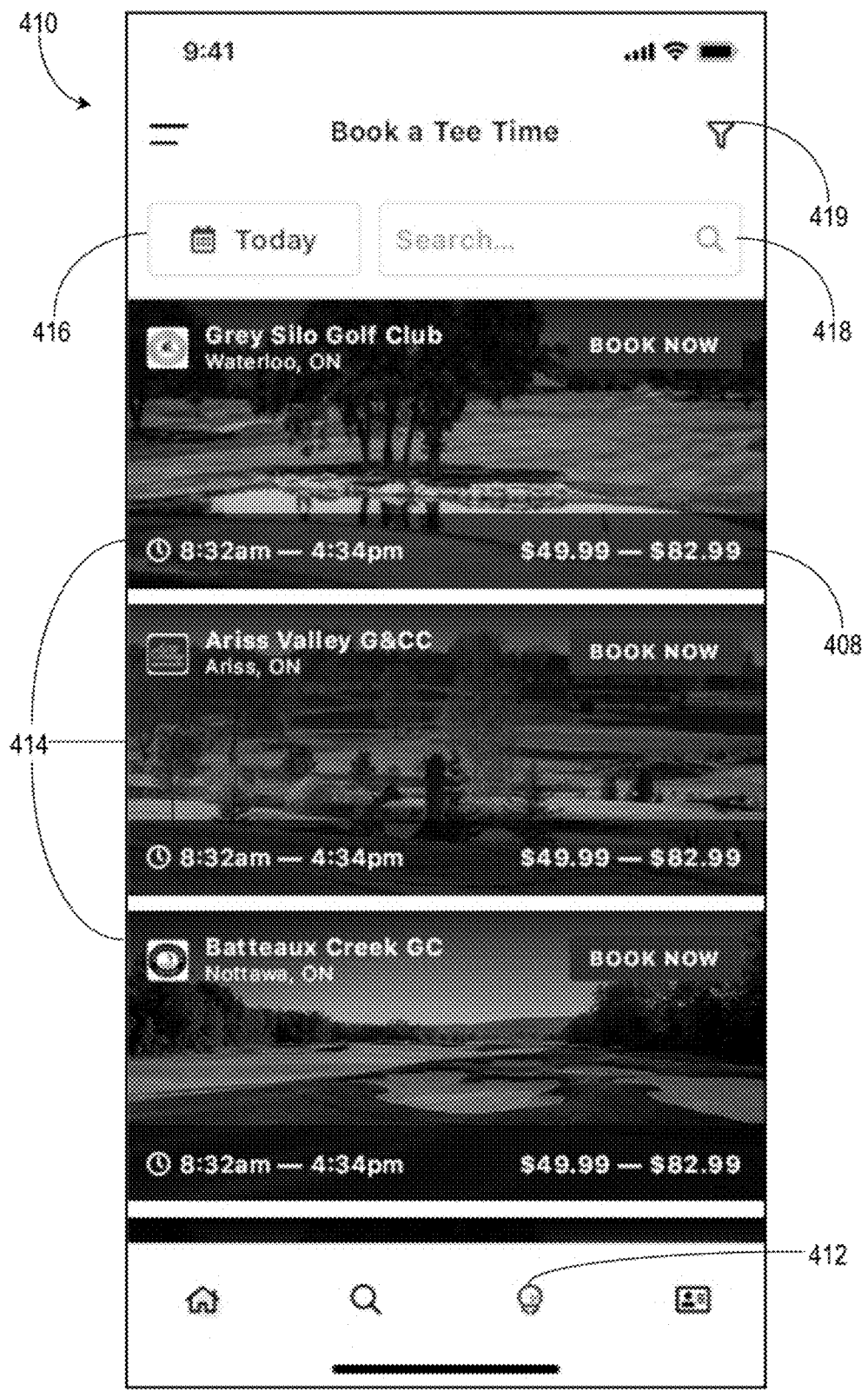
FIG. 4C is an exemplary screenshot of a tee time booking page of the mobile application, according to an embodiment.

Referring to FIG. 4C, shown therein is an exemplary screenshot of a tee time booking page 410 of the mobile application (i.e. mobile application 118 shown in FIG. 1), according to an embodiment. The tee time booking page 410 is displayed upon a touch gesture on a tee time button 412. The tee time booking page 410 includes a plurality of tee times 414 (i.e., tee times 244 shown in FIG. 2B). Tee times 414 may be filtered by date by a touch gesture on a calendar button 416. Tee times 414 may be searched by location, by entering a location in the search bar 418. Tee times 414 may be filtered according to other parameters by a touch gesture on a filter button 419.

Figure 4D:
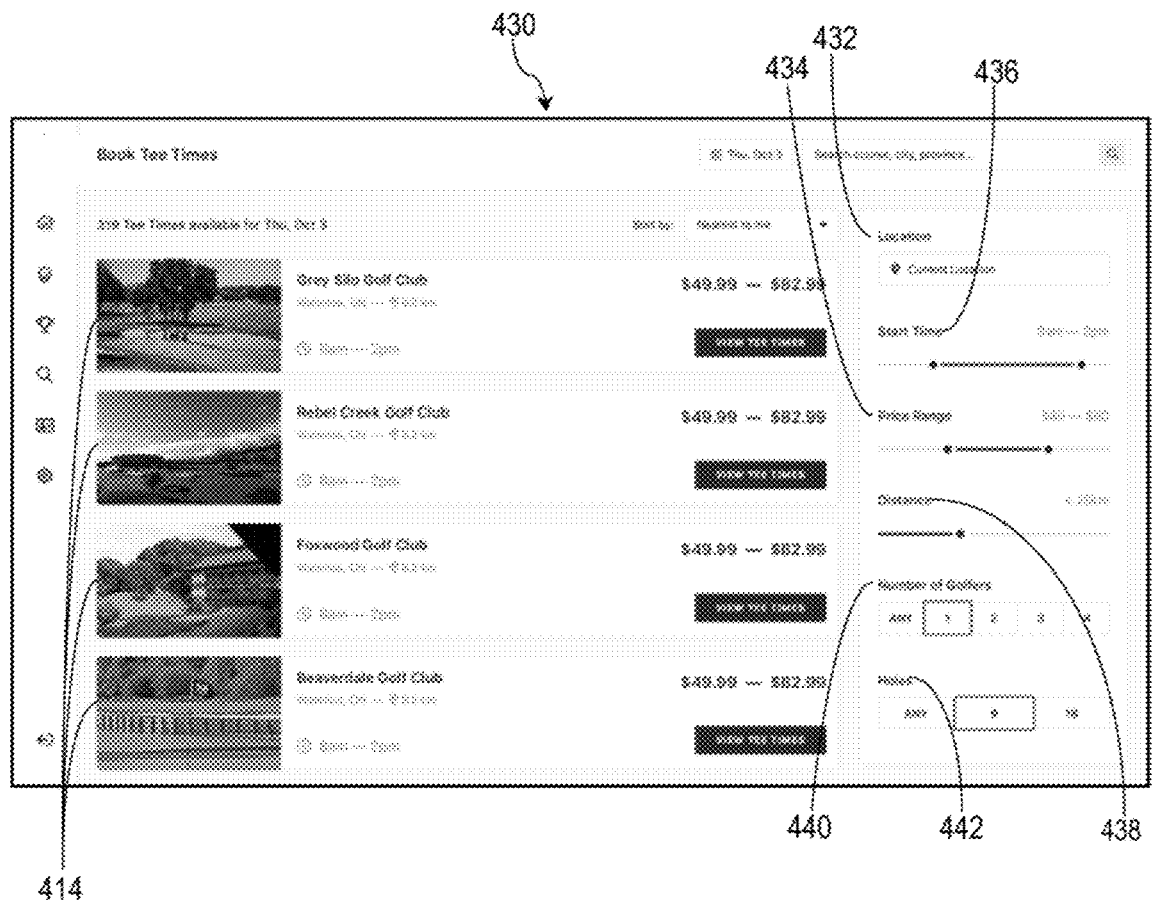
FIG. 4D, is an exemplary screenshot of a tee time booking page of a web application, according to an embodiment.

Referring to FIG. 4D, shown therein is an exemplary screenshot of a tee time booking page 430 of a web application (i.e., web application 116 shown in FIG. 1), according to an embodiment. The tee time booking page 430 is similar to the tee time booking page 410 in FIG. 4B and displays substantially the same information. The tee time booking page 430 includes tee times 414. The tee times 414 may be filtered by location by entering a location in the search field 432. The tee times 414 may be filtered by may be filtered start time, price range and distance by adjusting the respective sliders 434, 436, 438. The tee times 414 may be filtered by the number of golfers 440 and the number of holes 442.

Figure 4E:
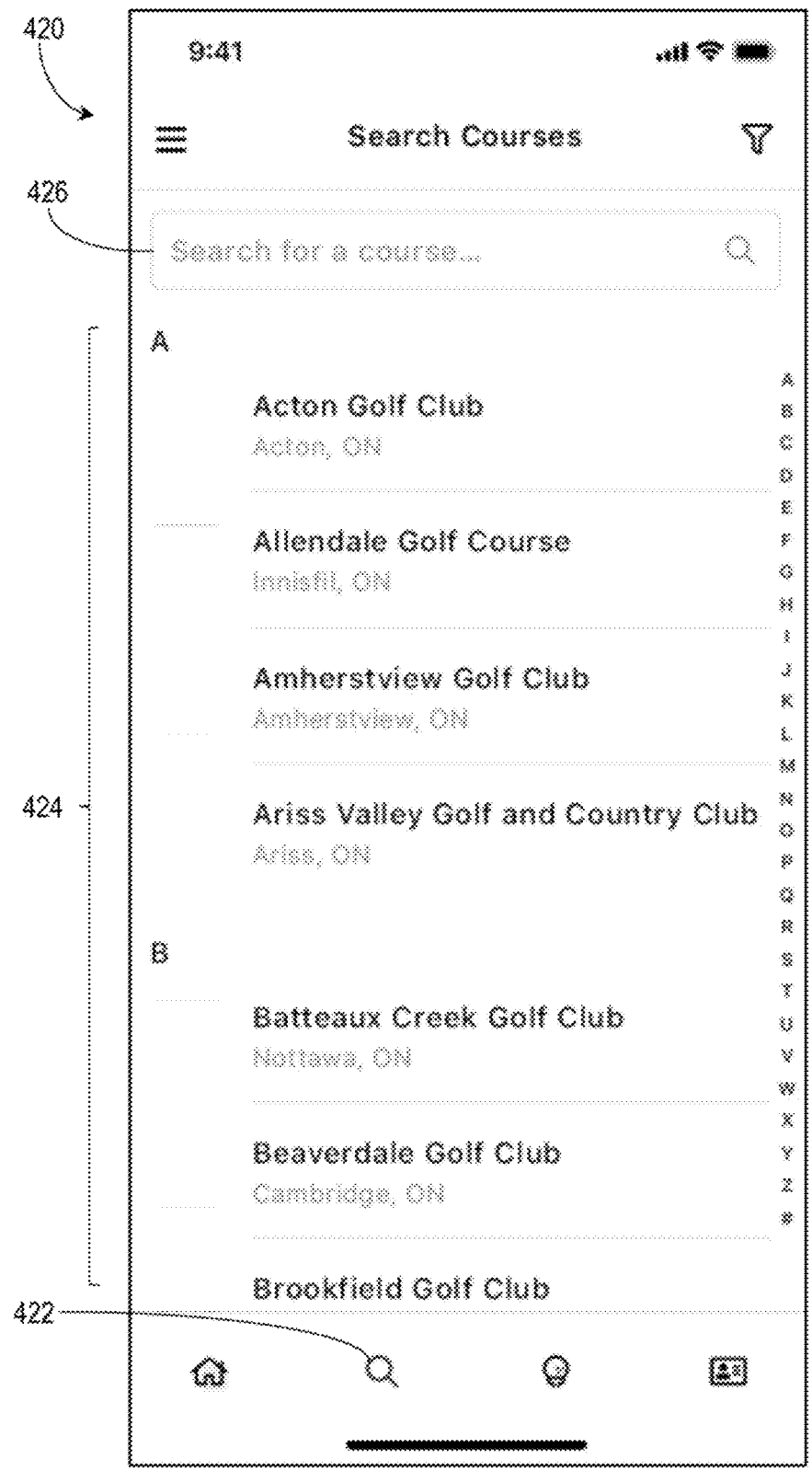
FIG. 4E, is an exemplary screenshot of a search page of the mobile application, according to an embodiment.

Referring to FIG. 4E, shown therein is an exemplary screenshot of a search page 420 of the mobile application (i.e. mobile application 118 shown in FIG. 1), according to an embodiment. The search page 420 is displayed upon a touch gesture on a search button 422. The search page 420 displays a list 424 of golf courses in alphabetical order. The list 424 may be scrolled by a touch gesture. A customer may select a golf course by a touch gesture to view deals (i.e., tee times 714 or tickets 721) advertised by the golf course. Golf courses may be filtered, by entering a golf course in the search bar 426.

Referring back to FIG. 4A, at 354, the backend system 102 applies comparison criteria (166) to determine whether the point balance (627) is greater than or equal to the point value for the deal. If the point balance (627) is greater than or equal to the point value, the method 350 proceeds to Act 360.

At 360, the point value is displayed as a purchase price for the deal. For example, the point value (157, 159) is displayed with the deal on the online marketplace (136). According to another embodiment, at 360 the purchase price for the deal may be displayed as $0 or free.

If, at 354 the point balance (627) is less than the point value, the method 350 proceeds to Act 356. At 356, the backend system 102 calculates a point difference (184) by subtracting the point balance (627) from the point value. In this way, the points balance (627) is used to pay a portion of the point value, leaving the point difference (184) as the balance owing for the deal. The point difference (184) is stored in the memory 162.

At 358, the point difference (184) is converted to a dollar difference (186) according to the conversion criteria (164). The dollar difference (186) represents the balance in dollars owing for the deal once the point balance (627) is subtracted from the point value.

At 362, the dollar difference (186) is displayed as a purchase price for the deal. For example, the dollar difference (186) is displayed with the deal on the online marketplace (136). Now referring to FIG. 4B, a purchase price 408 is displayed with the deal 406.

Referring back to FIG. 4A. Acts 352, 354, 356, 358, 360 and 362 may be performed substantially in real-time when a customer enters search criteria (174) to search for deals. According to an embodiment, when a customer searches for deals, the purchase cost for the deal is displayed as a points difference (184) or dollar difference (186), rather than the point value for the deal.

At 364, the purchase of the deal is confirmed. If the purchase price for the deal is displayed as the dollar difference (186) at Act 362, the customer may pay the dollar difference (186) by electronic payment, for example, credit card. If the customer pays the dollar difference (186), the paid electronic funds are allocated between the golf course offering the deal and the parent golf association according to the payment criteria (180). If the customer pays the dollar difference, reward points earned for the purchase are added to the point balance (627) according to reward the criteria (172). If the purchase price for the deal is displayed as the point difference (184) at Act 360, the customer may pay the point difference (184) using their point balance (627). If the customer pays the point difference (184), the point difference (184) is deducted from the point balance (627).

At 366, a confirmation number for the deal is generated by the backend system (102). The confirmation number may be a barcode or alphanumeric code that is specific to the purchase confirmed at Act 364. The confirmation number is sent to the customer by email and stored by the backend system (102) for confirmation purposes. The customer may view the confirmation number for the purchase by, for example, navigating to their deals on the mobile application (118) running on the customer device (106) or by retrieving the confirmation number from email.

At 368, the customer may then present the confirmation number to use the deal and play. A golf course employee may verify that the confirmation number presented by the customer matches the confirmation number stored as an order (146). An advantage of the method 350, is that the deal (whether a tee time 714, tee time voucher 718 or ticket 721) is prepaid and no payment is made at the golf course, saving time for both golfers and golf course employees. If the deal is used, the method 350 ends. In the event the customer cancels the deal, or inclement weather or course closure prevents the deal from being used, the method 350 proceeds to Act 370 to initiate a refund without requiring the exchange of funds.

At 370, if the purchase price for the deal at Act 360 was the point value, the method 350 proceeds to Act 374. If the purchase price for the deal at Act 362 was the dollar difference (186), the method 350 proceeds to Act 372.

At 372, the dollar difference (186) is converted back into points according to the conversion criteria (164).

At 374, the points are credited to the customer's point balance (627) to effect a refund. According to an embodiment, Act 374 may only credit a portion of the points to the point balance (627) to effect a partial refund.

Figure 5:
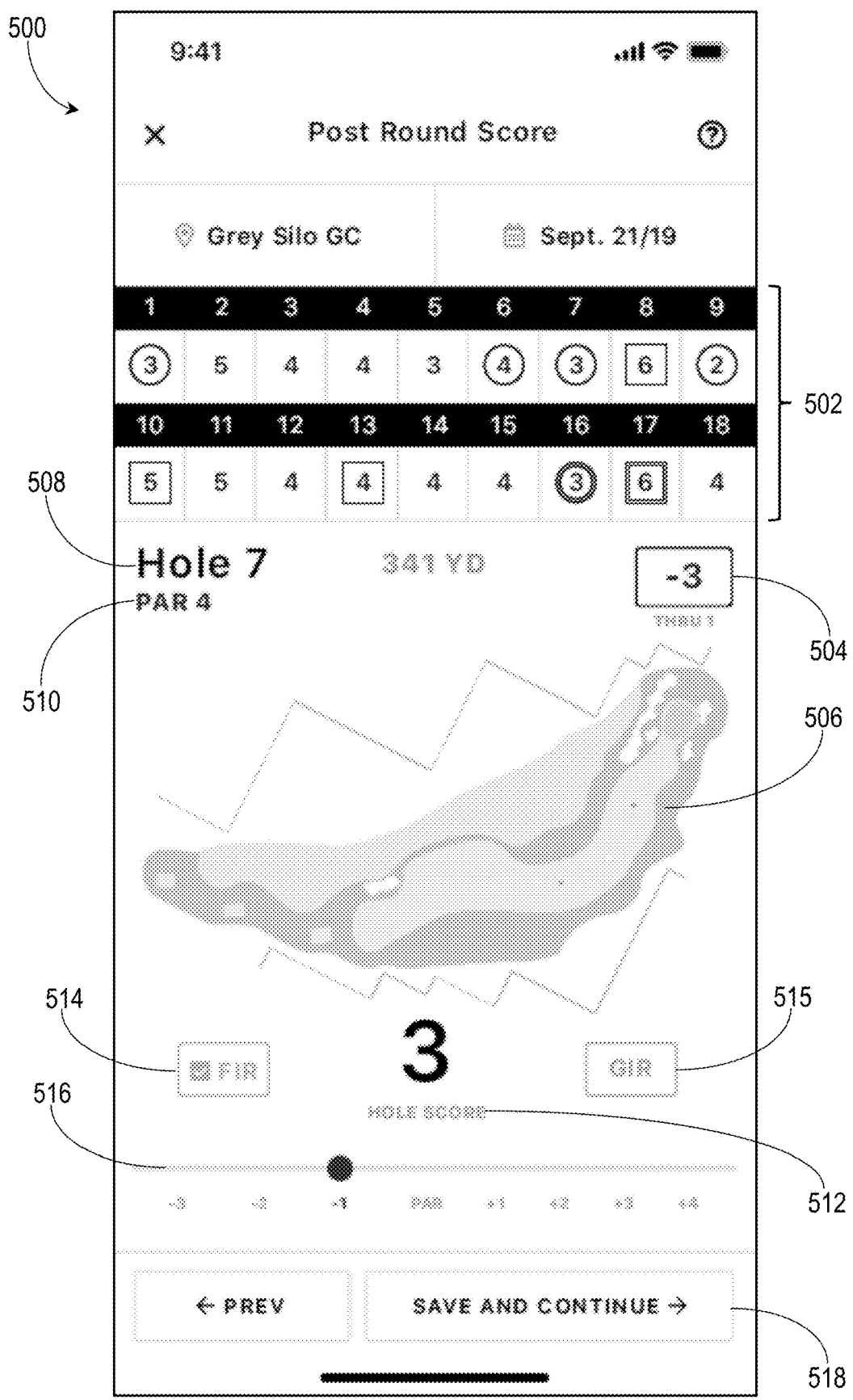
FIG. 5, is an exemplary screenshot of score tracking on the mobile application according to an embodiment.

Referring to FIG. 5, shown therein is an exemplary screenshot of a score tracking page 500 of the mobile application running on a customer device (i.e. mobile application 118 on customer device 106 shown in FIG. 1), according to an embodiment. The score tracking page 500 includes a course summary 502 and a round score 504. The course summary 502 displays a summary of scores for each hole and the round score 504 displays the overall score for the round. Each hole shown on the course summary 502 may be selected by a touch gesture to display the information for the hole. The score tracking page 500 includes a map 506, a current hole 508, a par 510, and a current hole score 512. The map 506 shows a layout of the hole being played. The hole number 508 indicates the hole being played. The par 510 indicates the par for the hole being played. The current hole score 512 shows the score for the hole being played. The score tracking page 500 includes a score meter 516 for showing the current hole score 512 relative to par 510 for the hole. The score tracking page 500 includes a fairway-in-regulation 514 and green-in-regulation 515 selectors for tracking of approach shots.

The score tracking page 500 includes a save button 518. The save button 518 may be selected by a touch gesture. The save button 518 may be selected to send score tracking parameters, including the current hole 508, the current hole score 512 and approach shot selectors 514, 515 from the customer device (i.e. customer device 106 running the mobile application 118 shown in FIG. 1) to the backend system (i.e. backend system 102 shown in FIGS. 1 and 2) for storage. The current hole 508 provides the current physical location of the player on the course. Thus, as the player progresses through the round of golf, the hole number is entered by the player on the customer device and received by the backend system to physically track the physical location of the player, and may be used to stagger the tee times/tee shots of subsequent players.

Referring back to FIG. 2, score information sent from the mobile application to the backend system 102 is stored in the database 120 under a league scoresheet 652, a league skin sheet 658, a tournament scoresheet 743, or a tournament skin sheet 749 depending on the format the customer is playing. According to an embodiment, the score information may be sent from the mobile application to the backend system 102 and stored in real-time.

The real-time tracking of scores provides a functional improvement to the the system 100 when compared to a score tracking system wherein scores are received only after a player has completed a round of golf. In such a scenario, there may be a bottleneck once a round of golf is completed and multiple player scores must be received and processed by the system leading to a strain on system resources (i.e. memory usage, processing power). The real-time tracking of scores may provide for a reduction in the consumption of system resources by receiving and processing player scores in real-time (potentially after each shot is played), rather than at the end of a round when all player scores are received and processed at once. Consequently, with real-time score tracking, the use of system 100 resources may be spaced out over the course of the entire round of golf, rather than causing a high resource usage by tracking scores at the end of the round.

While the above description provides examples of one or more apparatus, methods, or systems, it will be appreciated that other apparatus, methods, or systems may be within the scope of the claims as interpreted by one of skill in the art.

The invention claimed is:

1. A system for automatically providing rate integrity in golfing products and real-time tracking, comprising:
a backend system and a user device;
the backend system comprising:
a processor; and
a memory operably coupled to the processor, and having stored thereon processor-executable instructions that, when executed, cause the processor to:
store product parameters for a product in a database, including a dollar value for the product and a jurisdiction where the product is sold, wherein the product is one of a tee time and a tee time voucher;
normalize the dollar value to a point value according to conversion criteria set by a backend administrator, wherein the conversion criteria is specific to the jurisdiction and includes a tax rate for the jurisdiction, to provide rate integrity across different jurisdictions;
generate a deal for the product to be presented on an online marketplace;
set a unique booking engine URL for accessing the deal at one or more golf courses;
transmit the deal to the online marketplace for presenting to a user according to posting criteria set by a course/client administrator; search for the deal on the online marketplace, according to search criteria received from a user device;
compare a point balance of the user of the online marketplace to the point value to determine a purchase price for the deal;
adjust the purchase price for the deal according to pricing criteria based on memberships of the user at the one or more golf courses to determine an adjusted purchase price for the deal;
present the adjusted purchase price as the price for the deal on the online marketplace;
provide the unique booking engine URL to the user device when the search criteria matches the deal;
receive a payment equivalent to the adjusted purchase price, wherein at least a portion of the payment is electronic funds;
allocate the electronic funds between client accounts according to payment criteria;
receive and record score tracking parameters from the user device in real-time during a round of golf corresponding to the tee time or the tee time voucher, wherein the score tracking parameters include a hole number;
track a physical location of the user in real-time according to the hole number; and
stagger a subsequent tee time based on the physical location of the user;
the user device comprising:
a processor; and
a memory operably coupled to the processor, and having stored thereon processor-executable instructions that, when executed, cause the processor to:
present the online marketplace to the user via an application running on the user device;
present a search interface for receiving the search criteria input by the user;
transmit the search criteria to the backend system over a wireless communications network;
present a score tracking interface for receiving the score tracking parameters input by the user during the round of golf; and
transmit the score tracking parameters to the backend system over the wireless communications network in real-time.

2. The system of claim 1, wherein the memory further comprises instructions that cause the processor to:
set the point value as the purchase price for the product if the point balance is greater than, or equal to, the point value.

3. The system of claim 2, wherein the memory further comprises instructions that cause the processor to:
process a refund of the purchase price, wherein the point value is added to the point balance.

4. The system of claim 1, wherein the memory further comprises instructions that cause the processor to:
calculate a point difference of the point balance and the point value if the point balance is less than the point value;
convert the point difference to a dollar difference according to the conversion criteria; and
set the dollar difference as the purchase price for the product.

5. The system of claim 4, wherein the memory further comprises instructions that cause the processor to:
process a refund of the purchase price, wherein the dollar difference is converted to a refund point value, according to the conversion criteria; and
add the refund point value to the point balance.

6. The system of claim 1, further comprising:
an administrator device for entering the product parameters received by the backend system,
wherein the administrator device is connected to the backend system over a communications network.

7. A computer-implemented method for automatically providing rate integrity in golfing products and real-time tracking, comprising:
storing, by a backend system, parameters for a product in a database, including a dollar value for the product and a jurisdiction where the product is sold, wherein the product is one of a tee time and a tee time voucher;
normalizing, by the backend system, the dollar value to a point value according to conversion criteria set by a backend administrator, wherein the conversion criteria is specific to the jurisdiction and includes a tax rate for the jurisdiction, to provide rate integrity across different jurisdictions;
generating, by the backend system, a deal for the product to be presented on an online marketplace;
setting, by the backend system, a unique booking engine URL for accessing the deal at one or more golf courses;
transmitting, by the backend system, the deal to the online marketplace for presenting to a user according to posting criteria set by a course/client administrator;
presenting, by a user device, the online marketplace to the user via an application running on the user device;
presenting, by the user device, a search interface for receiving the search criteria input by the user;
transmitting, by the user device, the search criteria to the backend system over a wireless communications network;
searching for the deal on the online marketplace, by the backend system, according to search criteria received from the user device comparing, by the backend system, a point balance of the user of the online marketplace to the point value to determine a purchase price for the deal;

adjusting, by the backend system, the purchase price for the deal according to pricing criteria based on memberships of the user at the one or more golf courses to determine an adjusted purchase price for the deal;

presenting, by the backend system, the adjusted purchase price as the price for the deal on the online marketplace;

providing, by the backend system the unique booking engine URL to the user device when the search criteria matches the deal;

receiving, by the backend system, a payment equivalent to the adjusted purchase price, wherein at least a portion of the payment is electronic funds;

allocating, by the backend system, the electronic funds between client accounts according to payment criteria;

presenting, by the user device, a score tracking interface for receiving the score tracking parameters input by the user during the round of golf;

transmitting, by the user device, the score tracking parameters to the backend system over the wireless communications network in real-time;

receiving and recording, in real-time by the backend system, score tracking parameters from the user device during a round of golf corresponding to the tee time or the tee time voucher, wherein the score tracking parameters include a hole number;

tracking, in real-time by the backend system, a physical location of the user according to the hole number; and staggering a subsequent tee time based on the physical location of the user.

8. The method of claim 7, wherein if the point balance is greater than, or equal to, the point value, the purchase price for the product is the point value.

9. The method of claim 7, wherein if the point balance is less than the point value, the method further comprises:

calculating, by the backend system, a point difference of the point balance and the point value; and converting, by the backend system, the point difference to a dollar difference according to the conversion criteria;

wherein the purchase price for the product is the dollar difference.

10. The method of claim 8, further comprising:

processing, by the backend system, a refund of the purchase price, wherein the point value is added to the point balance.

11. The method of claim 9, further comprising:

processing, by the backend system, a refund of the purchase price, wherein the dollar difference is converted to a refund point value, according to the conversion criteria; and adding, by the backend system, the refund point value to the point balance.

* * * * *